United States Patent
Bouldin et al.

(10) Patent No.: US 9,555,415 B2
(45) Date of Patent: Jan. 31, 2017

(54) APPARATUS AND METHOD FOR TRANSFORMING SOLID WASTE INTO USEFUL PRODUCTS

(71) Applicant: Bouldin Corporation, McMinnville, TN (US)

(72) Inventors: Floyd Bouldin, McMinnville, TN (US); Thomas Cantrell, McMinnville, TN (US)

(73) Assignee: Bouldin Corporation, McMinnville, TN (US)

( * ) Notice: Subject to any disclaimer, the term of this patent is extended or adjusted under 35 U.S.C. 154(b) by 0 days.

(21) Appl. No.: 13/803,638

(22) Filed: Mar. 14, 2013

(65) Prior Publication Data

US 2014/0008474 A1 Jan. 9, 2014

Related U.S. Application Data

(63) Continuation of application No. 10/545,144, filed as application No. PCT/US2004/006038 on Feb. 27, 2004, now abandoned.

(51) Int. Cl.
*B02C 13/286* (2006.01)
*B09B 3/00* (2006.01)
*B30B 9/30* (2006.01)

(52) U.S. Cl.
CPC .............. *B02C 13/286* (2013.01); *B09B 3/00* (2013.01); *B30B 9/3003* (2013.01)

(58) Field of Classification Search
CPC ................ B02C 2013/28672; B02C 18/22; B02C 18/2225; B02C 18/2291; B02C 2013/28618; B02C 2013/28627; B02C 13/286; B30B 9/301

USPC ................................................ 241/224
See application file for complete search history.

(56) References Cited

U.S. PATENT DOCUMENTS

| 1,490,162 | A | | 4/1924 | Dow |
| 2,780,987 | A | | 2/1957 | Wall |
| 2,825,377 | A | * | 3/1958 | Ostrowski ................ 241/69 |
| 2,837,290 | A | * | 6/1958 | Nagel ................ B02C 13/286 |
| | | | | 15/256.5 |
| 3,277,850 | A | | 10/1966 | Jackson |
| 3,564,993 | A | | 2/1971 | Kunitoshi Tezuka et al. |
| 3,792,817 | A | * | 2/1974 | Reilly .................... B02C 23/02 |
| | | | | 241/30 |
| 3,850,771 | A | | 11/1974 | Penque |
| 3,858,504 | A | | 1/1975 | Boyer |

(Continued)

FOREIGN PATENT DOCUMENTS

| EP | 1718532 | 10/2005 |
| WO | WO2005092708 | 10/2005 |

*Primary Examiner* — Matthew G Katcoff

(74) *Attorney, Agent, or Firm* — Lucian Wayne Beavers; Patterson Intellectual Property Law PC

(57) ABSTRACT

A system and method for processing solid waste disposal includes a hydrolyzer (80) and an injection assembly (30) for transferring waste to the hydrolyzer (80). The injection assembly (30) includes a sleeve (40), in which waste is compressed with a ram (37), and a movable gate (52), which opens to allow the compressed waste (68) to exit the sleeve (40) and enter the hydrolyzer (80). The hydrolyzer (80) includes a pressure vessel (84), a rotating shaft (108) contained within the vessel (84), and agitates attached to the shaft for moving and processing the material through the hydrolyzer (80).

17 Claims, 19 Drawing Sheets

(56) References Cited

U.S. PATENT DOCUMENTS

| | | | |
|---|---|---|---|
| 3,983,009 A * | 9/1976 | Neal | C10B 1/04 |
| | | | 202/211 |
| 4,099,457 A | 7/1978 | Hyden | |
| 4,110,281 A | 8/1978 | Dreer | |
| 4,153,404 A | 5/1979 | Ottman | |
| 4,423,844 A * | 1/1984 | Sours | B02C 18/0084 |
| | | | 241/236 |
| 4,569,649 A | 2/1986 | Gross | |
| 4,727,804 A | 3/1988 | Tondo et al. | |
| 4,729,304 A | 3/1988 | Gardella et al. | |
| 4,772,430 A | 9/1988 | Sauda et al. | |
| 5,102,059 A * | 4/1992 | Nyberg et al. | 241/243 |
| 5,302,331 A | 4/1994 | Jenkins | |
| 5,363,758 A | 11/1994 | Wildes et al. | |
| 5,427,650 A | 6/1995 | Holloway | |
| 5,667,152 A * | 9/1997 | Mooring | 241/37.5 |
| 5,683,044 A * | 11/1997 | Gueldenpfennig | B02C 13/04 |
| | | | 241/14 |
| 5,803,143 A * | 9/1998 | Willis | 144/373 |
| 5,863,476 A | 1/1999 | Wier | |
| 6,017,475 A | 1/2000 | Cantrell | |
| 6,234,780 B1 | 5/2001 | Liu et al. | |
| 6,237,864 B1 * | 5/2001 | Firdaus | 241/92 |
| 6,306,248 B1 | 10/2001 | Eley | |
| 6,325,106 B1 | 12/2001 | Esser | |
| 6,397,492 B1 | 6/2002 | Malley | |
| 7,101,164 B2 | 9/2006 | Bouldin | |
| 7,303,160 B2 | 12/2007 | Bouldin et al. | |
| 7,503,759 B2 | 3/2009 | Bouldin | |
| 7,883,331 B2 | 2/2011 | Bouldin | |
| 2007/0199613 A1 | 8/2007 | Bouldin et al. | |

* cited by examiner

ROTATION

ROTATION

ROTATION

APPARATUS AND METHOD FOR TRANSFORMING SOLID WASTE INTO USEFUL PRODUCTS

CROSS-REFERENCES TO RELATED APPLICATIONS

This application is a continuation application which claims benefit of co-pending U.S. patent application Ser. No. 10/545,144, with an effective filing date of Feb. 27, 2004, entitled "Apparatus and Method for Transforming Solid Waste into Useful Products", which is a National Phase application based on PCT/US2004/006038, filed Feb. 27, 2004, entitled "Apparatus and Method for Transforming Solid Waste into Useful Products", both of which are hereby incorporated by reference in their entireties.

BACKGROUND OF THE INVENTION

The present invention relates to solid waste disposal, and, more particularly, to apparatuses, systems, and methods for transforming solid waste into useful products, including a reusable, treatable, or readily degradable material.

Solid waste disposal can generally be defined as the disposal of normally solid or semi-solid materials, resulting from human and animal activities, which are useless, unwanted, or hazardous. "Solid waste" generally comprises "garbage," including decomposable wastes from food; "rubbish" including combustible decomposable wastes, such as paper, wood, and cloth, or non-combustible decomposable wastes, such as metal, glass, and ceramics; "ashes" including the residue of the combustion of solid fuels; "large wastes" including demolition and construction debris and trees; dead animals; "sewage treatment solids" including the material retained on sewage-treatment screens, settled solids, and biomass sludge; "industrial wastes" including chemicals, paints, and sand; "mining wastes" including slag heaps and coal refuse piles; and "agricultural wastes" including farm animal manure and crop residues.

Modern management of waste disposal began in the late 1800's and by the 1890's more than half of America's cities utilized some system of collection and disposal of refuse. Such refuse often included ashes, food and dry rubbish, which each had a specific secondary use. Food scraps were fed to animals on the farms, the ashes filled potholes in roads and "unhealthy" swamps, and the dry rubbish was sorted for valuables. Rags, paper and the like, made more paper, and metals went back into production as reusable goods. The secondary use of much early refuse made such disposal systems as modern day landfills unnecessary.

By the 1930's food scraps, rags and paper were mixed together and carted to an incinerator. Incineration was cheaper and easier than sorting the refuse for secondary use because the mixture of materials could be collected at one time and burned together, and incineration continues to be used today.

Incinerators of conventional design burn refuse on moving grates in refractory-lined chambers. The combustible gases and the solids they carry are burned in secondary chambers. In addition to heat, the products of incineration include the normal primary products of combustion including carbon dioxide and water, as well as oxides of sulfur and nitrogen and other gaseous pollutants. The nongaseous products are fly ash and unburned solid residue.

In the 1940's, sanitary landfills proliferated. A sanitary landfill is generally considered the cheapest satisfactory means of waste disposal, but only if suitable land is within economic range of the source of the wastes. Typically, collection and transportation costs account for seventy-five percent of the total cost of solid waste management. In modern landfills, refuse is spread in thin layers, each of which is compacted by heavy industrial equipment such as bulldozers before the next layer is spread. When about 3 meters of refuse has been laid down, it is covered by a thin layer of clean earth which also is compacted.

In any event, by the 1950's, with the explosion of consumer products focusing on disposability, the amount of refuse generated increased dramatically. In fact, some reports suggest that by the 1970's five pounds of garbage per capita were discarded daily as compared to 2.7 pounds in the 1920's. In the 1980's, the public began to appreciate that congested landfills were polluting drinking water. At this time, recycling and composting began a resurgence and, today, they are at the forefront of community living.

Recycling and composting is recognized as an efficient way to handle organic solid waste and to reintroduce nutrients into nutrient depleted soil. In addition, recycling has transformed discarded materials, such as cellulose, wood, grass, leaves, cardboard, pallets, tree limbs, etc., plastics (polystyrene, polyethylene, polypropylene, PVC, etc.), glass, and ceramics into reusable materials.

Although the benefits of recycling are recognized, by far the most common method of disposing of solid wastes in the United States is the deposition of such wastes on land or in "landfills," which may account for more than ninety percent of the nation's municipal refuse. Incineration accounts for most of the remainder, whereas composting of solid wastes accounts for only an insignificant amount.

With regard to landfills, although pollution of surface and groundwater is believed to be minimized by taking such precautions as: lining and contouring the fill; compacting and planting the cover; selecting proper soil; diverting upland drainage; and placing wastes in sites not subject to flooding or high groundwater levels, such pollution remains a concern. Gases are generated in landfills through anaerobic decomposition of organic solid waste. If a significant amount of methane is present, it may be explosive; therefore, proper venting and burning of the methane gases are often necessary to eliminate or alleviate these dangerous conditions.

With regard to incineration, the process introduces harmful by-products and pollutants into the atmosphere and incineration methods are known to destroy the useful hemicellulose component of woody cellulose materials contained in solid waste (see the explanation set forth below).

Because landfill and incineration methods of disposal are known to pose significant environmental problems and concerns for the municipality, government, private industry, and individuals, recycling has become an attractive alternative. The treatment and handling of solid waste for reuse is particularly attractive. Such treatment and handling of solid waste is referred to herein as "resource recovery."

Hammer mills incorporate rotating drums with free-floating hammers. They are designed to spin at a relatively high speed, such that material placed in front of the rotating drum is impacted by the hammers. Thus, hammer mills do not cut, shred or tear the material, but rely on impact forces to pulverize the material.

Grinders also incorporate rotating drums; however, grinder drums generally have a flat abrasive surface or include integral cutters, such that material placed in contact with the rotating drum is cut, torn, and shredded.

Shredders typically incorporate a pair of rotatable parallel shafts, having spaced apart cutters, which pull the material downward between the parallel shafts, causing the material to be shredded. In an overload condition, the rotation of the shafts may be momentarily reversed before resuming the shredding rotations, however, when a typical shredder becomes clogged with debris, it must be shut down for a lengthy de-clogging process.

Pressure vessel apparatuses, such as hydrolyzers, may be used for processing organic material, for example, animal carcasses or parts thereof, including organic wastes generated during meat and poultry production for human consumption. Such processing may be termed "metamorphic," in that a change of physical form, structure, or substance to the components of the waste is effected. Known hydrolyzer apparatuses have various shortcomings. For example, these conventional vessels are prone to repeated and continuous clogging when trying to process certain waste material and thus require repeated down time intervals and disassembly to empty the interior of the vessel.

Turning now, from the machines, to the methods of resource recovery systems, certain resource recovery methods can be considered thermal processes, generally, but more specifically, combustion processes or pyrolysis processes. Pyrolysis, also called destructive distillation, is the process of chemically decomposing solid wastes by the introduction of heat in an oxygen-reduced atmosphere. This results in a gas stream containing primarily hydrogen, methane, carbon monoxide, carbon dioxide, and various other gases and inert ash, depending on the organic characteristics of the material being pyrolyzed.

Another approach to the treatment of waste is known as a "wet pulping process." In a wet pulping process the incoming refuse is mixed with water and ground into a slurry in an apparatus referred to as a wet pulper—a machine that is similar to a large kitchen disposal unit. Large pieces of metal and other non-pulpable materials are separated by a magnetic separator, and the residue is used as landfill. The slurry from the pulper goes into a centrifugal device called a liquid cyclone, which separates heavier non-combustibles such as glass, metals, and ceramics. The heavy fraction goes to a glass and metal recovery system; the light fraction goes to a paper and fiber recovery system. Combustible residues are mixed with sewage sludge, mechanically dewatered, and incinerated. Noncombustible residues are used as landfill.

These aforementioned processes are among those which have been used in an attempt to transform solid waste into a more manageable form, however, the resulting end-product of these processes is not always useful.

The useful components of solid waste and. the problems associated with extracting such components using known resource recovery systems will now be discussed. "Woody" cellulose materials, found in most solid waste, includes cellulose, a carbohydrate of unknown molecular structure, but which may be represented by the empirical formula ($C_6H_{10}O_5$); lignin, an organic substance closely allied to cellulose and forming the essential part of woody fibers; and hemicellulose, which serves as the binding agent for the constituent elements of the wood-like cellulose molecule and is useful in applications such as papermaking.

The hemicellulose is composed of two general classes of substances: (1) those collectively called xylons whose molecules are formed by polymerization of certain forms of pentose sugars; and (2) glucomannans, whose molecules are formed by polymerization of certain forms of hexose sugars, primarily glucose and mannose. These substances cannot be readily disassociated from cellulose-containing material without being destroyed. For example, combustion and pyrolysis processes are known to destroy the hemicellulose and prevent its use as a bonding agent to form other molecules of cellulose. In this regard, many techniques used in resource recovery systems, including, oxidation, hydrogenation, alkaline hydrolysis, pyrolysis and use of powerful solvents, have limited utility because of their harsh and destructive nature.

To summarize, the existing waste disposal systems have a variety of problems. Use of landfills and incinerators ignore the useful components of solid waste and pose significant environmental problems Existing apparatuses of resource recovery systems are inefficient in that they must be shut down for significant periods of time when becoming clogged with debris.

Additionally, existing methods of resource recovery systems incorporate harsh techniques, which not only destroy useful components of solid waste, such as hemicellulose, but also, in the case of certain solvents and oxidants, pose environmental concerns.

Furthermore, in all known methods of resource recovery systems, the resultant product may include microbes or microorganisms that require further consideration prior to disposal. In such cases the resultant products are believed to remain waste materials not suitable for use or transformation into useful articles.

Accordingly, there remains a need in the art for apparatuses and methods of resource recovery which satisfactorily addresses the problems set forth above.

BRIEF SUMMARY OF THE INVENTION

The present invention meets the above identified needs, and others, by providing efficient apparatuses and methods for transforming solid waste into useful products, including a reusable, treatable, or readily degradable material.

The apparatuses of the present invention include: a hinged hopper assembly which allows for the rapid removal of debris clogging a particle size reducing apparatus, such as a shredder; a material injection assembly, for transferring preprocessed waste material for further processing; a hydrolyzer, for metamorphically processing volumes of waste on a continuous basis; and a material handling apparatus, for shaping material exiting a hydrolyzer, a bioreactor, or other processing machine. The methods of the present invention include methods for the use of the above mentioned apparatuses, alone or in cooperation with other machines, and a method transforming solid waste into a useful material.

The hinged hopper assembly, as mentioned, allows for the rapid removal of objects that cannot be processed by any of the particle size reduction apparatus well known by those skilled in the art. Providing for rapid removal of objectionable debris keeps the particle size reduction apparatus from being damaged or shut down to remove clogs. An embodiment of the hinged hopper assembly includes a hopper adapted for receiving and delivering waste to a shredder. The hinged hopper assembly includes a gate, which, may be positioned to block the flow of waste from the hopper into the shredder. The hinged hopper assembly additionally includes a hinge, upon which the hopper may pivot to expose the shredder. In this manner, the shredder may be exposed to allow for rapid removal of any clogging debris. Once the clogging debris is removed from the shredder, the hopper may be pivoted, back to its original position, the gate may be opened, and waste may again be received into the hinged hopper assembly for introduction into the shredder.

Another apparatus of the present invention is a material injection assembly, for transferring solid waste or preprocessed waste material to a hydrolyzer. An embodiment of the material injection assembly of the present invention receives preprocessed waste via a hopper and transfers the waste to a connected hydrolyzer for further processing. The embodiment includes: the hopper; a pipe sleeve; a ram contained within the pipe sleeve and operably connected to a hydraulic cylinder, which moves the ram back and forth within the pipe sleeve, and an in-feed gate assembly, including a sliding gate operated by a hydraulic cylinder, which opens and closes a passageway to the hydrolyzer.

The hopper receives waste and delivers it to the pipe sleeve for processing. The ram may be placed by the attached hydraulic cylinder in three positions within the pipe sleeve: a first, fully extended position; a second, fully withdrawn position; and a third position, in between the first two positions. While in the first and third positions, the ram blocks the passageway from the hopper into the pipe sleeve. While the ram is in the second position, waste is allowed to pass from the hopper into the pipe sleeve.

The embodiment of the material injection assembly may be operated in the following manner. The ram is placed in the fully extended first position, the gate is placed in a closed position, and waste is introduced into the hopper. Waste that has previously been introduced into the material injection assembly is held in a portion of the pipe sleeve and is referred to as "a partial plug." In any event, after the waste has been placed in the hopper, the ram is withdrawn and to the second position, allowing the waste to fall from the hopper into the pipe sleeve along side the partial plug. Next, the ram is moved into the third position, which pushes the newly introduced waste against the partial plug to form, what is refer to as, "a complete plug." The gate remains in the closed position, allowing the complete plug to be uniformly compressed. Following compression of the plug, the gate is raised, allowing for communication between the pipe sleeve and the hydrolyzer. The ram is then moved into the fully extended first position, forcefully inserting the plug into the hydrolyzer. Finally, the gate is returned to the closed position, and the operation is repeated as desired.

The embodiment of the material injection assembly, just described, may be used as part of a system comprising various apparatuses, including a hydrolyzer. One such hydrolyzer that may be used is the hydrolyzer of the present invention, which is designed to metamorphically process a volume of waste on a continuous basis. An embodiment of the hydrolyzer receives waste material through an inlet, carries it through a pressure vessel for processing and ultimately expels processed material through an exit port.

The pressure vessel contains a rotating shaft having an plurality of paddles extending outwardly therefrom. Additionally, the shaft includes a plurality of agitators, extending outwardly therefrom. The agitators may be of any configuration that permits formed movement of waste material through the pressure vessel, for example, paddles or bars. In the embodiment of the hydrolyzer, the agitator bars are secured to a section of the shaft that is nearer to the inlet, while the paddles are secured to a section of the shaft that is nearer to the exit port. However, in embodiments which do not incorporate agitator bars, the paddles may extend along the entire length of the shaft. Whatever the configuration of the agitators, one purpose is to move material through the pressure vessel while being processed.

In any event, in the embodiment, both the paddles and the bars are secured to the shaft such that the placement of adjacent individual paddles and bars forms a helical pattern along the length of the shaft. This helical pattern facilitates the movement of material from the inlet to the exit port of the hydrolyzer, while preventing clogging and promoting self-cleaning.

The paddles and the bars may be placed in the helical pattern along a portion of or the entire length of the shaft, depending on the properties of the material being processed by the hydrolyzer and the period of time it is desired that the material remain within the hydrolyzer. In this regard, a helical pattern along the entire length of the shaft will generally result in the material remaining within the hydrolyzer for a shorter period of time.

The processed material (sometimes referred to herein as "Fluff") exiting the hydrolyzer may be further processed by additional apparatus, such as the material handling apparatus of the present invention. An embodiment of the material handling apparatus includes an inlet, a compaction chamber, a plunger assembly, a containment assembly, and a cutter assembly.

Fluff is received through the inlet and enters the compaction chamber, terminating at a stop plate, where it is compressed by the plunger assembly. The plunger assembly includes a ram, situated within the compaction chamber, and a hydraulic cylinder, which is secured to and moves the ram back and forth within the chamber, to compress the Fluff against a stop plate.

The stop plate is connected to a containment cylinder and is initially held at an interface between the compaction chamber and a block forming section of the apparatus. As the Fluff is compressed against the stop plate by the ram, the containment cylinder is slowly overridden, allowing the stop plate to slowly retreat into the block forming section. Fluff is introduced into the compaction chamber and compressed into the compacted block of Fluff within the apparatus, to form a more lengthy block of Fluff, until the stop plate has fully retreated into the block forming section. At this time, the cutting assembly is used to cut off the portion of the block contained within the block forming section.

The cutter assembly includes a knife which is attached to and operated by a hydraulic cylinder. The knife is interposed between the compaction chamber and the block forming section and includes an aperture that may be aligned with the compaction chamber, allowing compacted Fluff to pass through the aperture into the block forming section, before being cut.

In this regard, the knife slides relative to the compaction chamber as it is extended by the cylinder, which action cuts the block of compacted Fluff. In the embodiment, the block forming section is secured to the knife and the cutting action causes the block forming section, containing the freshly cut block, to slide away from the compaction chamber. In the embodiment, the apparatus also contains an expansion chamber having an inlet, to which the aperture of the knife may be aligned following the cutting action, creating a passageway between the block forming section and the expansion chamber. The stop plate may then be extended by the containment cylinder, forcing the freshly cut block from the block forming section, into the expansion chamber. The knife and attached block forming section are ultimately allowed to return to alignment with the compression chamber and the operation may be repeated.

As mentioned above, in addition to apparatuses used in solid waste disposal, the present invention relates to methods for using the above mentioned apparatuses, alone or in cooperation with other machine, and to other methods for transforming solid waste into a reusable, treatable, or readily degradable material.

An embodiment of one method of the present invention includes the following steps: preprocessing of raw material; transferring preprocessed material to a hydrolyzer; processing the material within the hydrolyzer; transferring processed material, or Fluff, from the hydrolyzer; and extruding or molding the processed material.

The preprocessing step of the embodiment is one in which the solid waste is shredded, ground, and, if desired, dewatered prior to insertion into a hydrolyzer or a bioreactor for processing. Preprocessing may also include one or more steps to remove substantial portions of inorganic material, such as metals, from the waste. For example, the waste could be preprocessed to remove ferrous metals, then the waste may be subjected to one or more size reduction apparatuses, and then the waste could be preprocessed to remove non-ferrous metals. The preprocessing may additionally include a step whereby liquid is extracted from wet portions of the solid waste and redistributed to the dry portions of the solid waste to create a substantially uniform hydration level throughout the volume of preprocessed solid waste.

Next, the preprocessed material is transferred to a hydrolyzer whose interior vessel is heated in order to heat the material therein. The hydrolyzer includes an outer containment vessel having an exterior jacket and an interior pressure vessel. An airspace exists between the exterior jacket and the interior vessel. A heated steam inlet and exit port are attached to the jacket and communicate with the air space.

The preprocessed solid waste is processed within the interior of the hydrolyzer for a given length of time, which will vary depending upon the temperature and pressure within the steam jacket and hydrolyzer interior. Generally, the greater the temperature and pressure in the hydrolyzer, the faster the chemical reactions will occur. The pressure and temperature, in conjunction with the preprocessed composition of the material being processed, act as the catalyst to speed the chemical reaction of decomposition of the material within the hydrolyzer. This high temperature and pressure environment causes the material to rapidly decompose into its basic constituent elements, and allows them to recombine or remain in their organic cellulose form, and it kills any bacteria associated with the material.

After the allotted time within the hydrolyzer has elapsed, the material exits the hydrolyzer as "Fluff." The Fluff is a mixture of cellulose fibers and other elements present in the material prior to processing. The Fluff is then dried and may be remanufactured into useful articles, such as compressed bales of material or other molded or extruded articles. Chemical or natural additives may be added to enhance the characteristics of the material or add supplemental material characteristics as needed. In any case, Fluff can be used to manufacture plasticene cross ties, and building materials such as bricks, boards and blocks, etc., or it may be naturally land applied as compost material.

BRIEF DESCRIPTION OF THE SEVERAL VIEWS OF THE DRAWINGS

FIG. 6 includes the assemblies shown in. FIG. 2, wherein the hydrolyzer is shown in longitudinal cross-section;

DETAILED DESCRIPTION OF THE INVENTION

The present invention relates to solid waste disposal and includes apparatuses, systems, and methods for transforming solid waste into useful material.

Embodiments of the apparatuses of the present invention, which may be combined to create an embodiment of a system for transforming solid waste into useful material, may comprise the following: apparatuses to reduce the particle size of the waste (e.g., hammer mills, grinders, shredders); apparatuses to quickly remove objects which cannot be processed by the particle size reducing apparatuses (e.g., a hinged hopper assembly); apparatuses to remove metal (e.g., magnetic separators); apparatuses to separate size; apparatuses for transferring preprocessed waste material (e.g., a material injection assembly); apparatuses for decomposing the waste material (e.g., a hydrolyzer); apparatuses for transferring material from a hydrolyzer (e.g., a processed material handling apparatus); and apparatuses for shaping material exiting a hydrolyzer (e.g., a material handling apparatus).

Figure 1A:
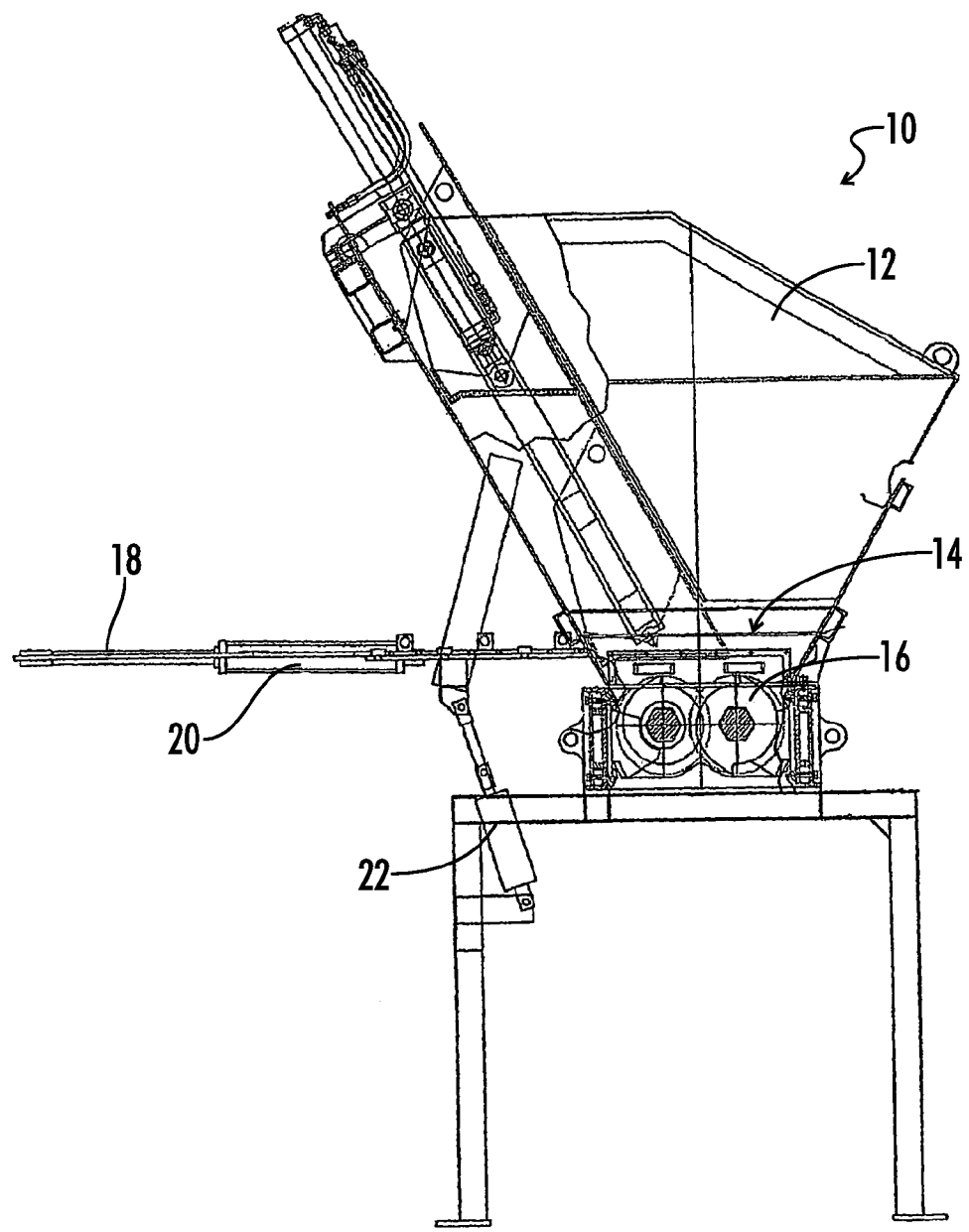
FIG. 1A is a side view of an embodiment of the hinged hopper of the present invention.
Figure 1B:
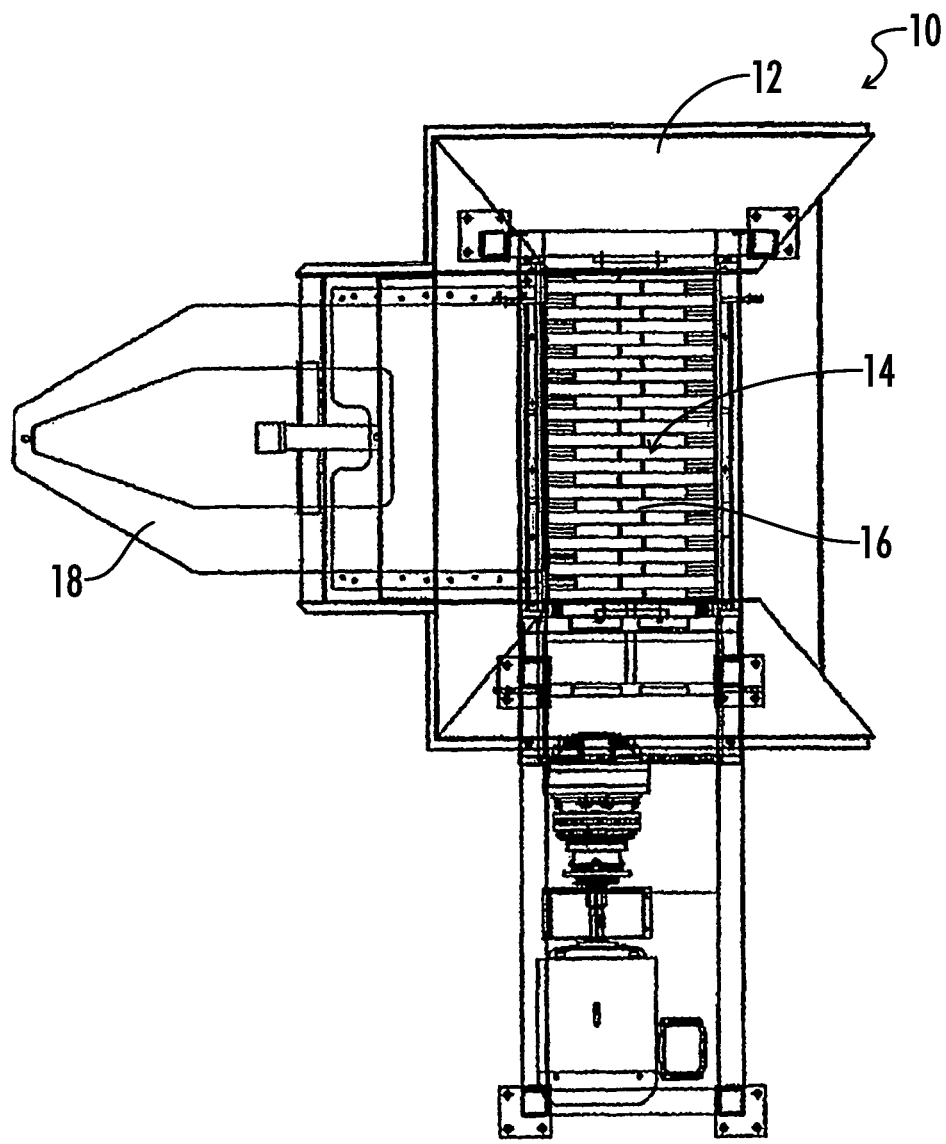
FIG. 1B is a top view of the embodiment of the hinged hopper of FIG. 1A.

One apparatus of the present invention is a hinged hopper assembly, which allows for the rapid removal of objects that cannot be processed by any of the particle size reduction apparatuses well known by those skilled in the art. Providing for rapid removal of objectionable debris prevents the particle size reduction apparatus from being damaged or shut down to remove clogs. Turning now to the drawings, wherein like numerals reference like elements throughout the various views, with reference to FIGS. 1A and. 1B, an embodiment of the hinged hopper assembly 10 includes a hopper 12 for receiving waste, which may fall through an inlet 14 into a shredder 16. The hinged hopper 10 includes a gate 18, which is operably connected to a first hydraulic cylinder 20. The cylinder 20 may be used to move the gate 18 into a position blocking the inlet 14, to limit or prevent waste moving from the hopper 12 into the shredder 16.

The hinged hopper 10 additionally includes a hinge upon which the hopper 12 may pivot away from the shredder 16. The hopper 12 may be pivoted away from the shredder 16 either manually, or with the assistance of a second hydraulic cylinder 22. In this manner, the shredder 16 may be exposed to allow for rapid removal of any debris clogging the shredder 16. Once the clogging debris is removed from the shredder 16, the hopper 12 may be pivoted back to its original position, the gate 18 may be opened, and waste may again be received into the hinged hopper assembly 10 for introduction into the shredder 16. As will be understood by those skilled in the art, operational safeguards may be installed according to known design criteria.

Figure 2:
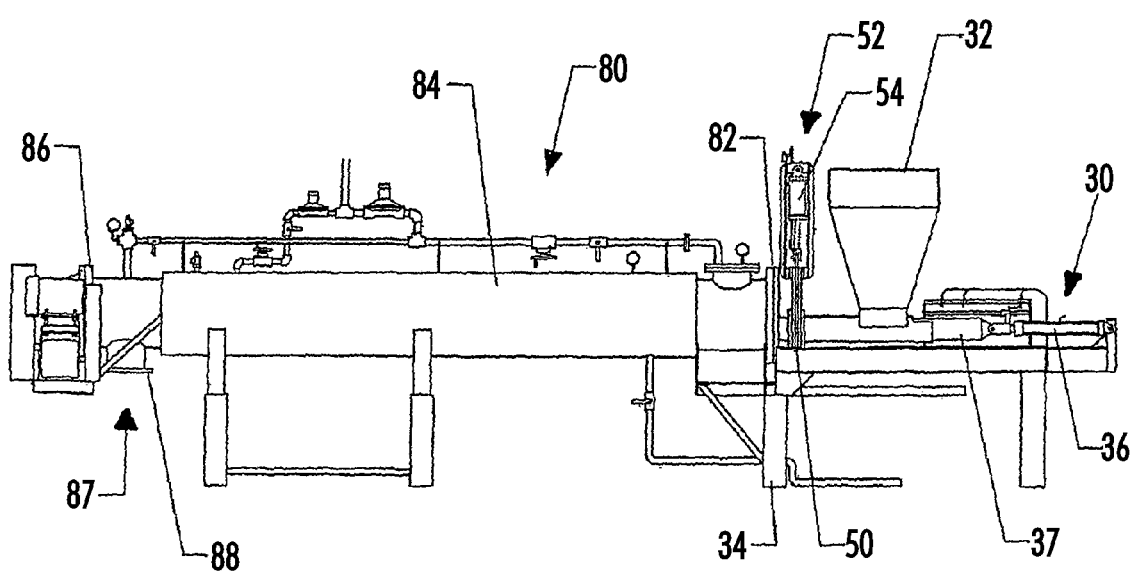
FIG. 2 is a side view of an embodiment of the material injection assembly of the present invention connected to an embodiment of the hydrolyzer of the present invention.

Another apparatus of the present invention is a material injection assembly, for transferring solid waste or preprocessed waste, to a hydrolyzer. Solid waste may be preprocessed, by way of example and not limitation, by reducing its particle size using an apparatus comprising grinders or shredders and removing metal using an apparatus comprising magnetic separators. With reference to FIG. 2, generally speaking, an embodiment of a material injection assembly 30 of the present invention receives preprocessed waste via a hopper 32 and transfers the waste through a sliding gate construction 50 to a connected hydrolyzer 80 for further processing.

Figure 3:
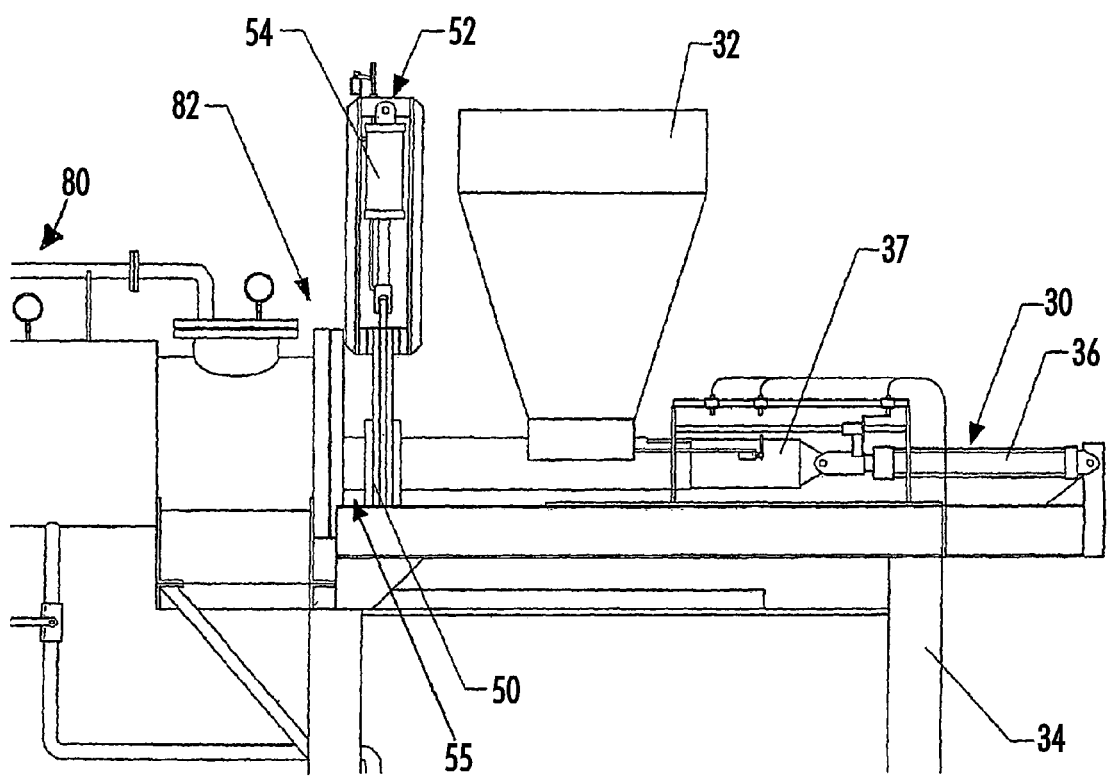
FIG. 3 is an enhanced side view of the material injection assembly of FIG. 2.
Figure 4:
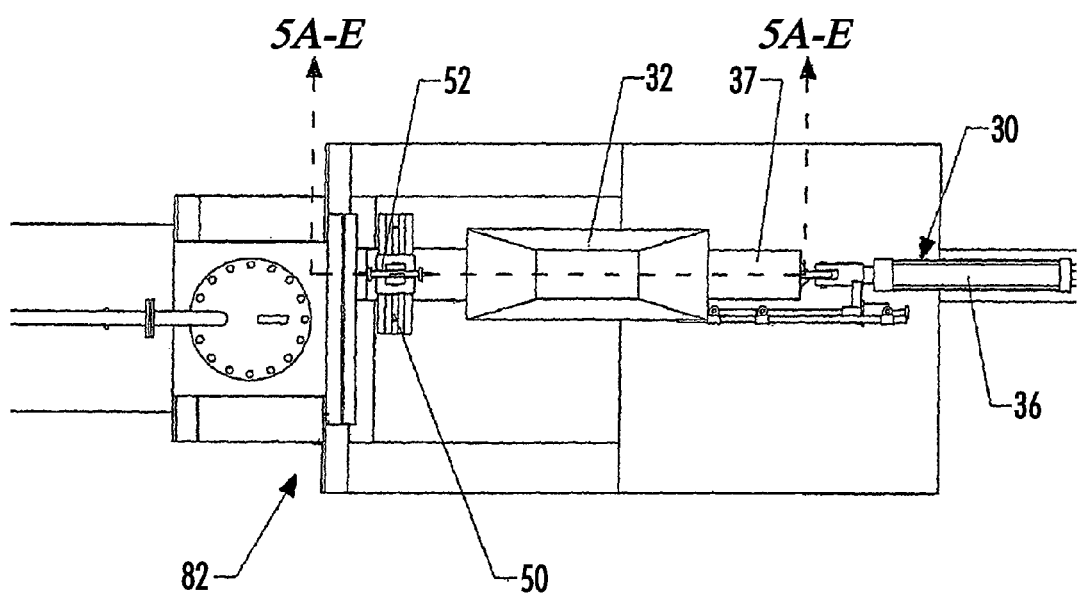
FIG. 4 is a top view of the material injection assembly of FIG. 3.

Turning now to FIGS. 3 and 4, more specifically, the illustrated material injection assembly 30 is supported by a platform 34 and comprises: the hopper 32, a hydraulic cylinder 36, a ram 37 operably connected to the cylinder 36, a pipe sleeve 40, and an in-feed gate assembly 52. The gate assembly 52 further comprises a hydraulic cylinder 54 and the sliding gate construction 50, operably connected to the cylinder 54, which opens and closes an internal passageway 55 (best shown in FIG. 5A) to an inlet 82 of the hydrolyzer 80.

Figure 5A:
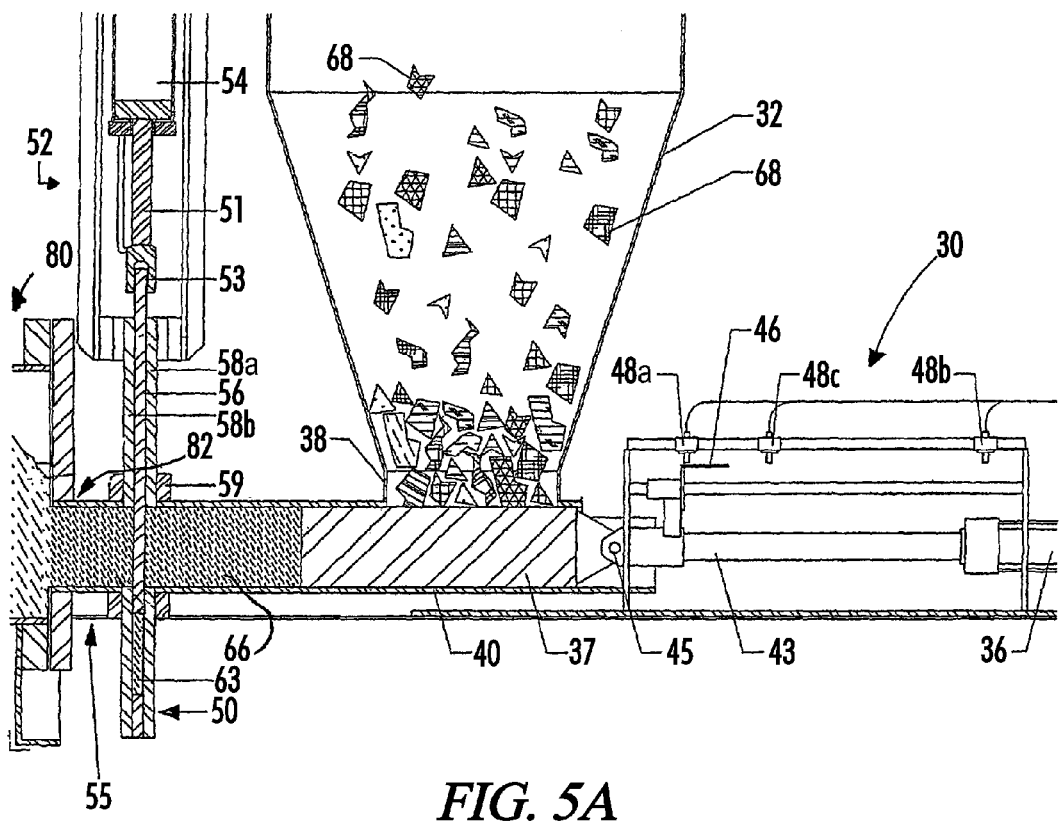
FIGS. 5A through 5E are various operational views of the material injection assembly of FIG. 4, as seen from longitudinal cross-section line A-A.
Figure 5B:
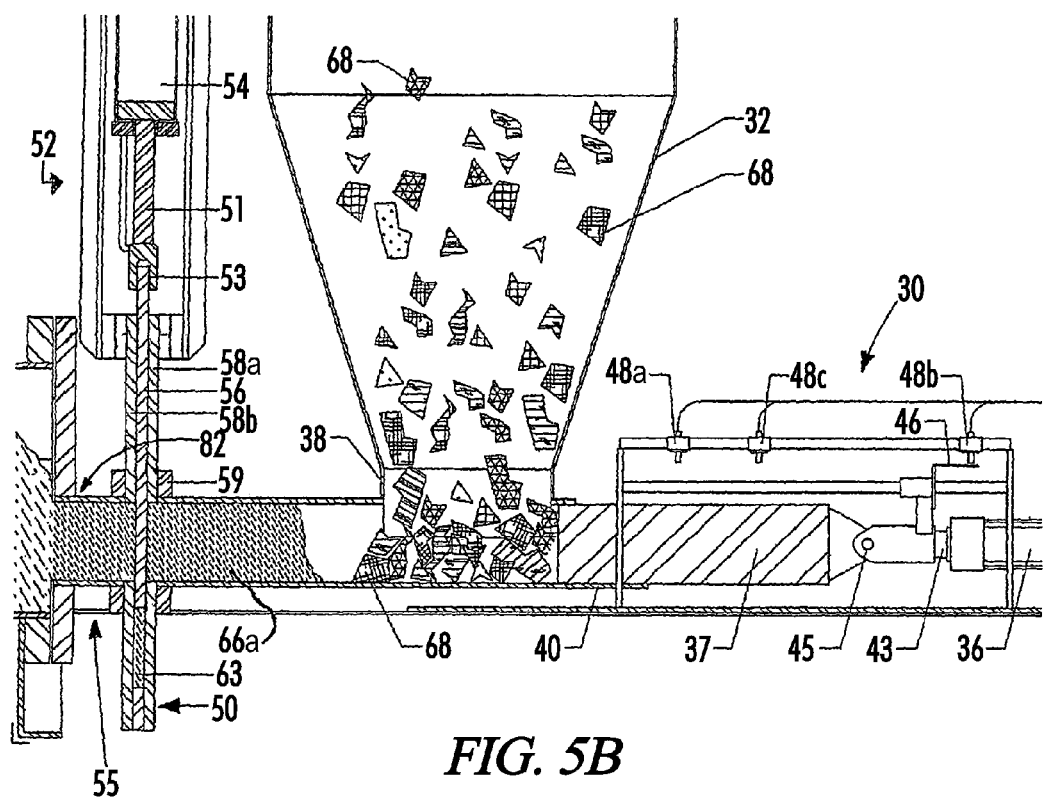

With reference to FIGS. 5A and 5B, the hopper 32 is adapted for receiving waste 68, which typically falls through to the bottom end 38 of the hopper 32 and into the pipe sleeve 40 for processing. In this regard, it is contemplated that the hopper 32 may include a static or vibrating grate (not shown) capable of prohibiting large objects from reaching the bottom end 38. The grate would allow all solid waste, except for these large objects, to fall from the hopper 32 and into the pipe sleeve 40. The ram 37 is situated within the pipe sleeve 40 and is manipulated back and forth within the pipe sleeve 40 by the hydraulic cylinder 36. The hydraulic cylinder 36 includes a shaft 43, which may be connected to the ram 37 by any well known connection, such as a pin engagement 45. In this embodiment, the hydraulic cylinder 36 moves the ram 37 into three positions, which may be described with reference to the contact made between a tenon 46, associated with the cylinder 36, and proximity switches 48a, 48b, and 48c.

Figure 5C:
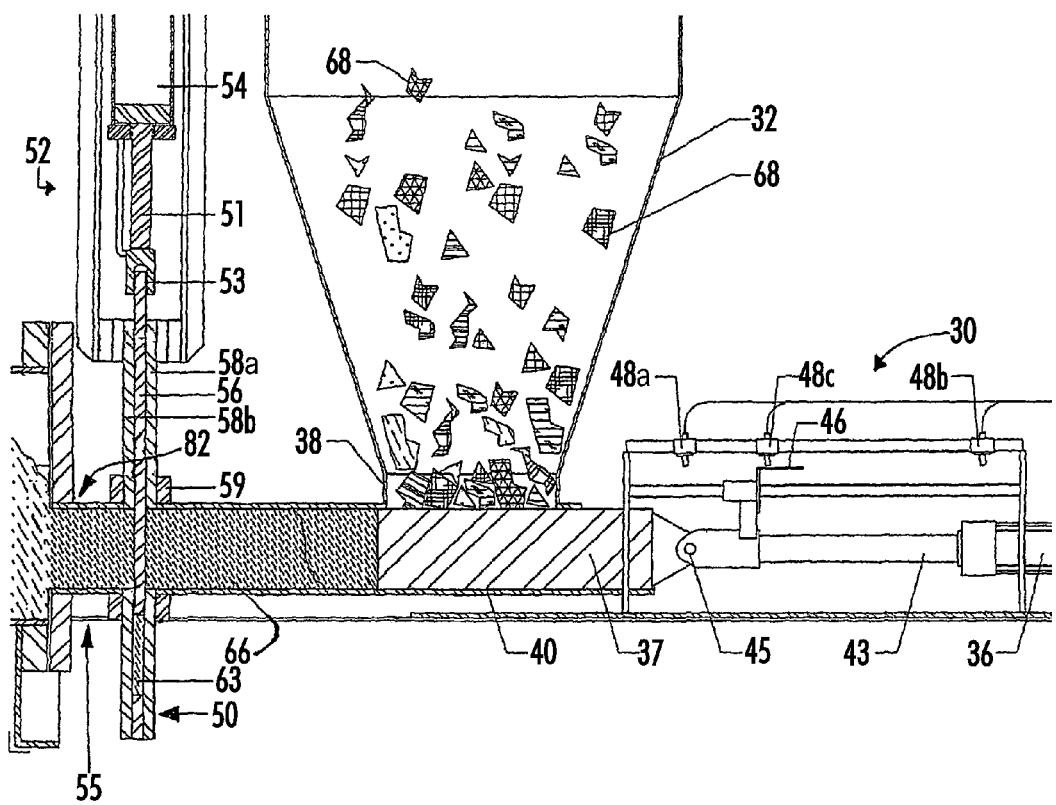

Specifically, a first distinct position best shown in FIG. 5A, wherein the ram 37 is fully extended, is achieved when the tenon 46 contacts a first proximity switch 48a. A second distinct position best shown in FIG. 5B, wherein the ram 37 is fully withdrawn, is achieved when the tenon 46 contacts a second proximity switch 48b. A third position, shown in FIG. 5C, is achieved when the tenon 46 contacts a third proximity switch 48c. When the tenon 46 contacts one of the switches 48a, 48b, 48c, a control signal is transmitted to the sliding gate construction 50.

Referring again to FIG. 5A, the illustrated sliding gate construction 50 of the gate assembly 52, which opens and closes access through the internal passageway 55 includes a gate plate 56 flanked by a pair of end plates 58a, 58b, which are secured to the pipe sleeve 40 by an attachment collar 59. The gate plate 56 is connected by a coupling 53 to shaft 51, driven by hydraulic cylinder 54 to cycle gate plate 56 between end plates 58a, 58b. When the gate plate 56 is in a closed position, as shown in FIGS. 5A through 5C, the interior of the pipe sleeve 40 is operationally disconnected from the hydrolyzer 80. However, when the gate plate 56 is in an open position, as shown in FIGS. 5D and 5E, an aperture 63 within gate plate 56 is aligned with the pipe sleeve 40 to permit the flow of waste to the hydrolyzer 80.

The manner in which the illustrated material injection assembly 30 may operate will now be discussed with reference to FIGS. 5A through 5E. Referring to FIG. 5A, the ram 37 is in the fully extended first position, wherein the tenon 46 is in contact with proximity switch 48a, the gate plate 56 is in a closed position, and waste 68 is introduced into the hopper 32. Waste which has previously been fed through the hopper 32 and is being held within the pipe sleeve 40 is referred herein as "a plug" and is generally designated by numeral 66. The plug 66 is referred herein as a "partial plug" 66a when, as shown in. FIG. 5C, it does not completely fill the space within the pipe sleeve 40 defined by the gate plate 56 and the ram 37.

Referring now to FIG. 5B, the ram 37 is shown fully in the retracted second position, with the tenon 46 in contact with the proximity switch 48b. In this position the waste 68 is permitted to flow from the hopper 32, through the inlet 38, and into the pipe sleeve 40 together with the partial plug 66. Turning now to FIG. 5C, the ram 37 is shown in a partially extended position, with the tenon 46 in contact with the proximity switch 48c. When moved into the partially extended position, ram 37 blocks the flow of waste 68 at the bottom end 38 and forms a complete plug 66 with the newly introduced waste. The gate plate 56 remains in the closed position, allowing the plug 66 to be uniformly compressed.

Figure 5D:
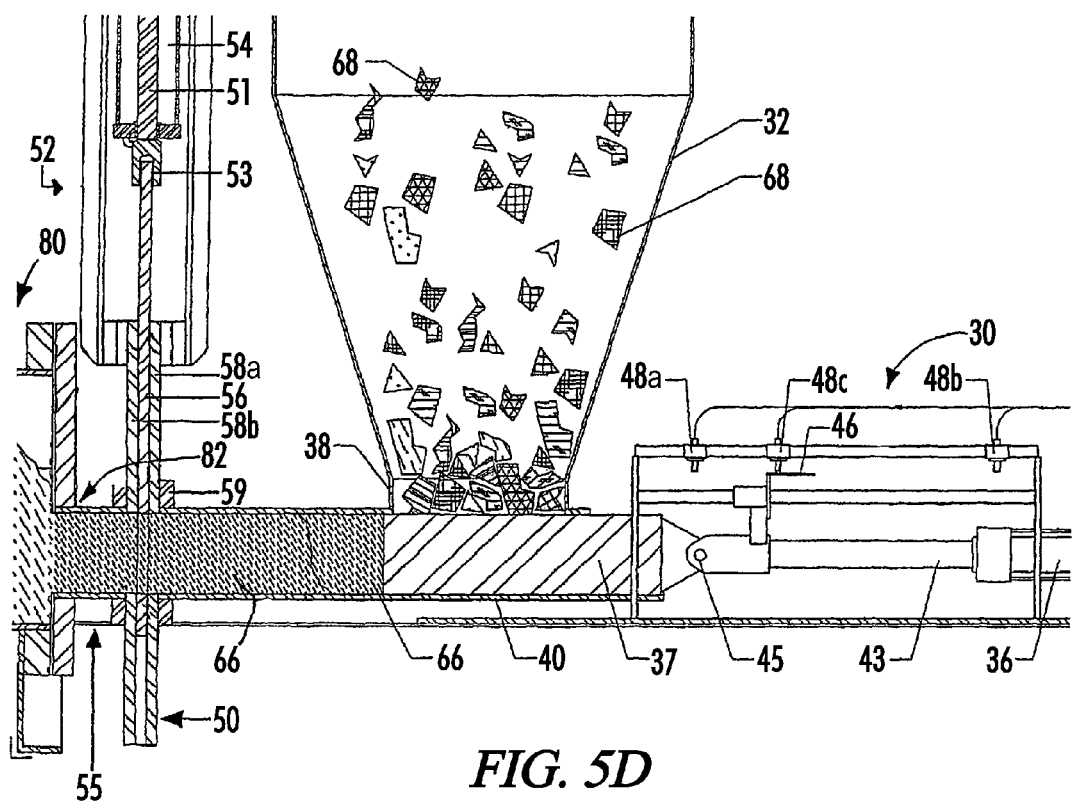
Figure 5E:
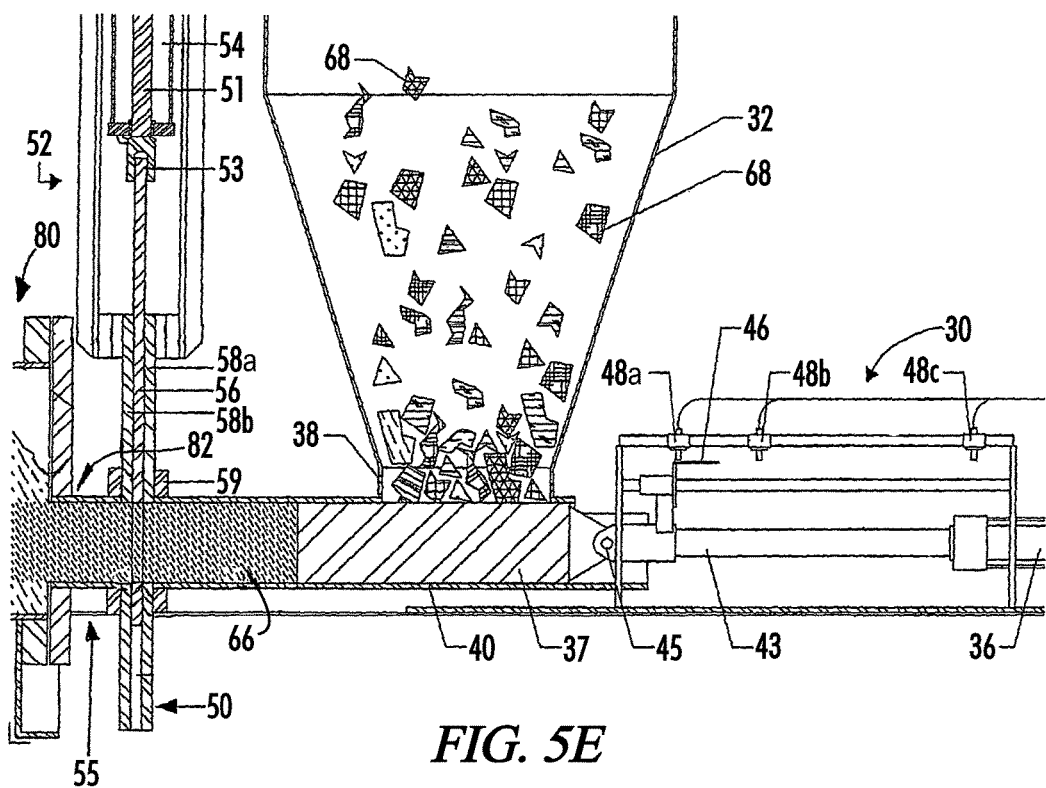

Referring now to FIG. 5D, following compression of the plug 66 the gate plate 56 is raised, allowing for access to the hydrolyzer 80. Next, as shown in FIG. 5E, the ram 37 is moved into the fully extended first position, forcefully inserting the plug 66 into the hydrolyzer 80. Referring back to FIG. 5A, the gate plate 56 is returned to the closed position, and the operation is repeated as desired.

Figure 6:
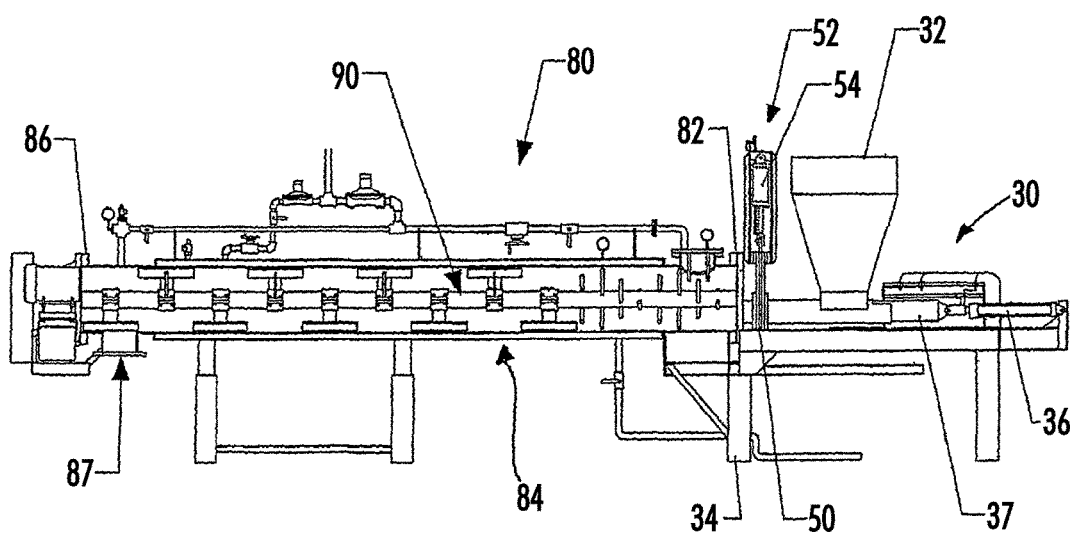

The embodiment of the material injection assembly 30, just described, may be used as part of a system comprising various apparatuses, including a hydrolyzer. One such hydrolyzer that may be used is the hydrolyzer of the present invention. Referring now to FIG. 2 and FIG. 6, the illustrated hydrolyzer 80 metamorphically processes a volume of waste on a continuous basis. The hydrolyzer 80 in this embodiment receives waste material in the form of a plug 66 through the inlet 82, includes a pressure vessel 84, an exit end 86, an exit port 87, and an attachment collar 88 for operationally connecting to apparatus for further processing.

Figure 7:
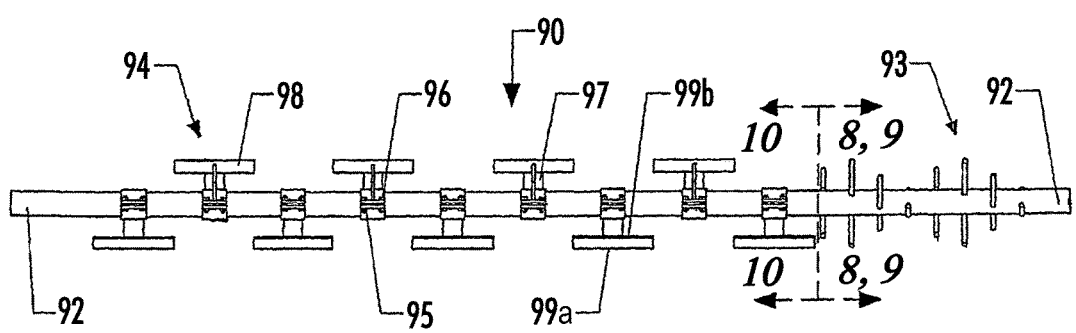
FIG. 7 shows the shaft of the hydrolyzer of FIG. 6.

Referring now to FIGS. 6 and 7, the pressure vessel 84 contains a rotating spindled shaft 90 comprising an axle or shaft 92 and a plurality of agitators extending outwardly therefrom. The agitators may be of any configuration that permits forward movement of waste material through the pressure vessel. By way of illustration and not limitation, two means for agitating and moving are shown, bars 93 and paddles 94. The agitator bars 93 are integral with or otherwise secured to the axle 92 by well known methods including welding or fasteners. The paddles 94 are likewise integral with or otherwise secured to the axle 92. Each paddle 94 includes a pedestal 97 terminating at a wiper blade 98 with a leading edge 99a and a trailing edge 99b. It is contemplated that either bars 93 or paddles 94 may extend along the entire length of the axle 92, or any combination thereof. In the illustrated embodiment of the hydrolyzer 80, agitator bars 93 are secured to that section of the axle 92 that is nearer to the inlet 82, while the paddles 94 are secured to that section of the axle 92 that is nearer to the exit end 86. Whatever the configuration of the agitators, one purpose is to move material through the pressure vessel 84 while being processed.

Figure 8:
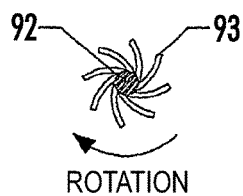
FIG. 8 shows the shaft of FIG. 7, as seen from the transverse cross-section line B-B.
Figure 9:
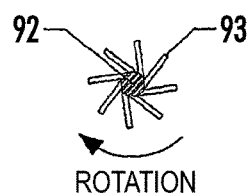
FIG. 9 shows an alternate embodiment of the shaft of FIG. 8.
Figure 10:
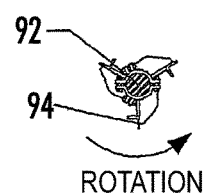
FIG. 10 shows the shaft of FIG. 7, as seen from the transverse cross-section line C-C.

As shown in FIGS. 7 through 10, agitators are secured to the axle 92 such that the placement of adjacent individual paddles 94 or bars 93 form a helical pattern along the length of the axle 92. This helical pattern facilitates the movement of material from the inlet 82 to the exit end 86 of the hydrolyzer 80, while preventing clogging and promoting self-cleaning. With reference to FIGS. 8 and 9, in the embodiment of the hydrolyzer 80, the agitator bars 93 form an angle with the axle 92 that is less than ninety degrees. The paddles 94 and the agitator bars 93 may be placed in the helical pattern along a portion of or the entire length of the elongated portion 92, depending on the properties of the material being processed by the hydrolyzer 80 and the period of time it is desired that the material remain within the hydrolyzer 80. In this regard, a helical pattern along the entire length of the elongated portion 92 will generally result in the material remaining within the hydrolyzer 80 for a shorter period of time.

The processed material (sometimes referred to herein as "Fluff") exiting the hydrolyzer 80 may be further processed by additional apparatus. One such embodiment is the material handling apparatus of the present invention illustrated in FIGS. 11 through 14F. One illustrated embodiment of the material handling apparatus 100, best shown in FIGS. 11 and 12, comprises an inlet 101, a compaction chamber 102, a plunger assembly 104, a containment assembly 105, and a cutter assembly 124.

The inlet 101 includes a coupling collar 103 for attachment to a cooperating collar, such as the collar 88 of the hydrolyzer 80, shown in FIG. 2. Fluff is received through the inlet 101 and enters the compaction chamber 102, which includes a plurality of circumferential fins 112, for providing structural support and to resist bending. Once the Fluff has been received by the compaction chamber 102, it is compressed by a plunger assembly 104.

The plunger assembly 104, matingly attached to the compaction chamber 102 by cooperating collar 110, includes a hydraulic cylinder 106 having a shaft 108 secured to and operating the movement of a ram 109. The ram 109 is situated and cycles within the compaction chamber 102 to compress the Fluff. While the fins 112 provide structural support for the compaction chamber 102, they also maintain alignment with the ram 109 as it reciprocates therein. The force of the ram 109 on the Fluff is sufficient to produce a compressed block of Fluff 166, shown in FIGS. 13A through 13H, within a volume defined by the compaction chamber 102. It will be understood by those skilled in the art that the term block may be used interchangeably with terms such as plugs and pig to mean a portion of compressed Fluff, and not as a limitation to any particular shape or configuration.

Figure 11:
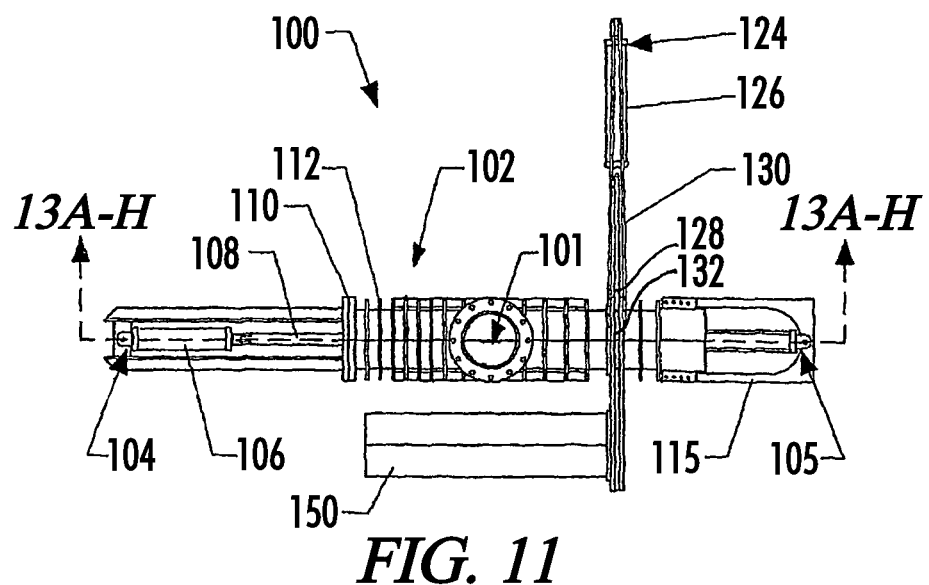
FIG. 11 is a top view of an embodiment of the material handling assembly of the present invention.
Figure 12:
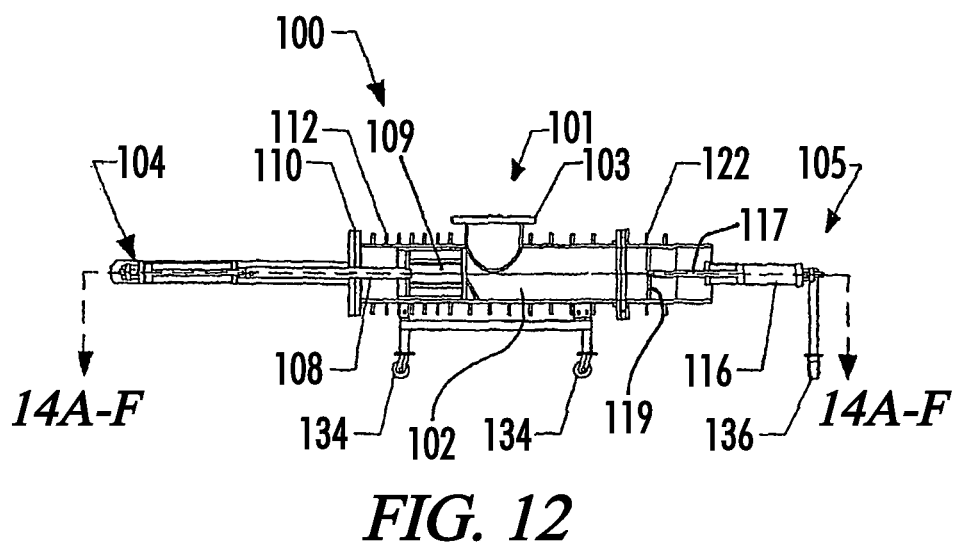
FIG. 12 shows the material handling apparatus of FIG. 11, as seen from longitudinal cross-section line D-D.

Referring still to FIGS. 11 and 12, the stop plate 119 is a structural element of the containment assembly 105, which further comprises a truss 115 and a containment cylinder 116. Cylinder 116 is attached to the truss 115 at one end and to a shaft 117 at the other end. The shaft 117, in turn, terminates at the stop plate 119. The stop plate 119 serves as a backstop for the ram 109 of the plunger assembly 104, enabling the Fluff interpositioned between the ram 109 and the stop plate 119 to form a compressed block having dimensions resembling the interior configuration of the compaction chamber 102 and a block forming section 122.

The illustrated embodiment of the material handling apparatus 100 comprises a block cutter assembly 124. With reference to FIGS. 11, 12, 14B and 14D, the block cutter assembly 124 comprises the block forming section 122 and a hydraulic cylinder 126, attached at one end to a frame 120 at a cross member 125 and attached at the other end to a shaft 127. The shaft 127 is attached at a distal end to a knife 128. The knife 128 cycles, supported by the frame 120, and includes an aperture 132 configured to be aligned with the compaction chamber 102 such that the block 166 may pass through the aperture 132 into the block forming section 122 before being cut by the knife 128.

Wheeled carriage assemblies 134, 136 may be provided to enable the material handling apparatus 100 to be supported and mobile. It is contemplated and will be understood by those skilled in the art, that all the component assemblies described herein may be supported by carriage assemblies, such as those shown, or motorized platforms to enable portability of individual assemblies or an entire system.

Figure 13A:
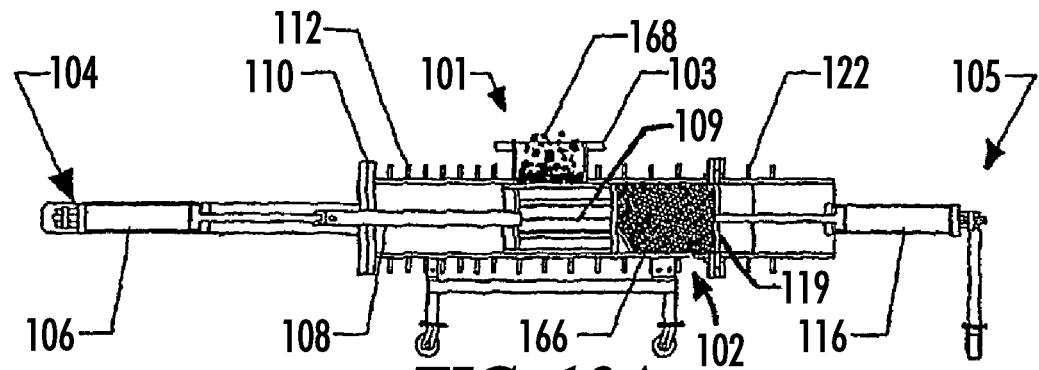
FIGS. 13A through 13H are various operational views of the material handling assembly of FIG. 12.
Figure 13B:
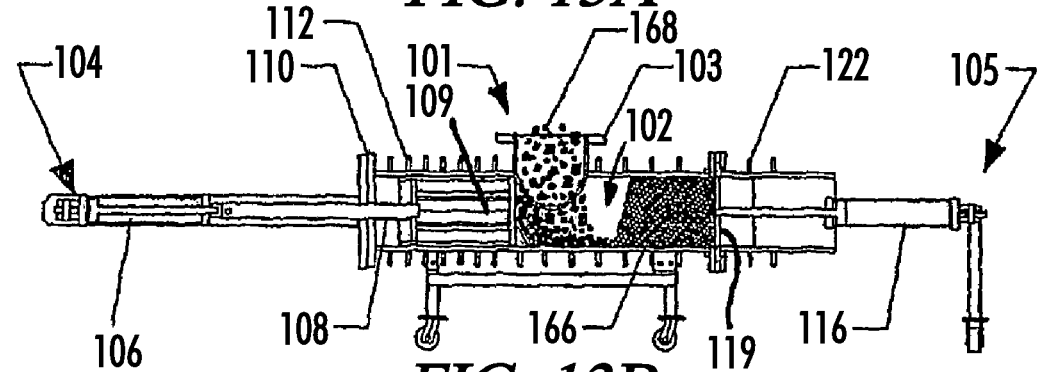
Figure 13C:
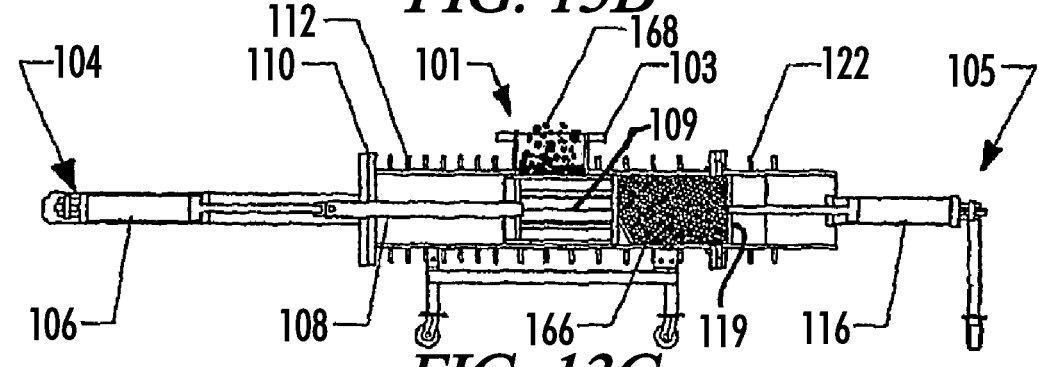

The manner in which the illustrated embodiment of the material handling apparatus 100 operates will now be discussed with reference to FIGS. 13A through 13H, and then with reference to FIGS. 14A through 14D. Referring first to FIG. 13A, the ram 109 is extended to a position which blocks the flow of Fluff 168 from the inlet 101 into the compaction chamber 102 and the stop plate 119 is positioned adjacent the compaction chamber 102 at the opening to the block forming section 122. Turning to FIG. 13B, the ram 109 is withdrawn to allow Fluff 168 to fall into the compaction chamber 102. As shown in FIG. 13C, the ram 109 is extended to compress Fluff 168 against the stop plate 119. Because plunger assembly 104 exerts more force than cylinder 116, cylinder 116 begins to be overridden by the block of Fluff 166 pushing against the stop plate 119, such that the stop plate is forced to retreat slightly into the block forming section 122.

Figure 13D:
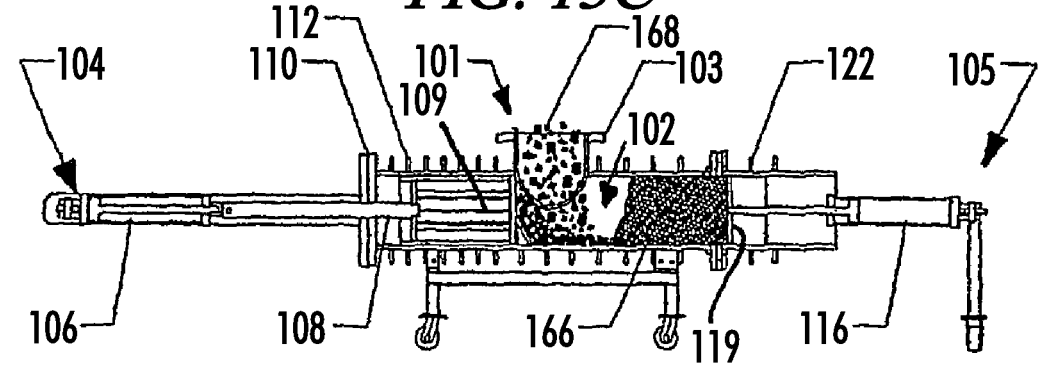
Figure 13E:
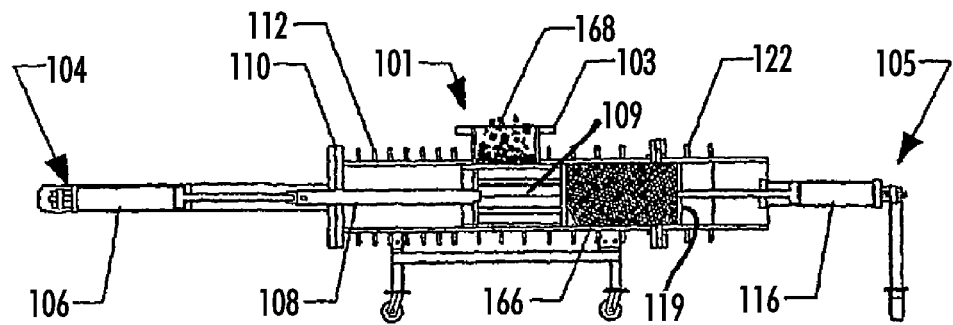

Turning now to FIG. 13D, the ram 109 is shown withdrawn, allowing additional Fluff 168 to be introduced into the compaction chamber 102. Referring to FIG. 13E, the ram is extended, forcing the newly added Fluff 168 against the block 166. The force of the ram 109 against the block 166 pushes stop plate 119 further, into the block forming section 122.

Figure 13F:
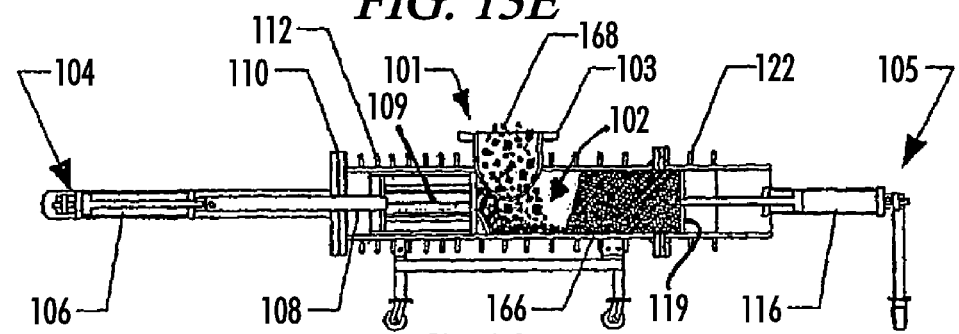
Figure 13G:
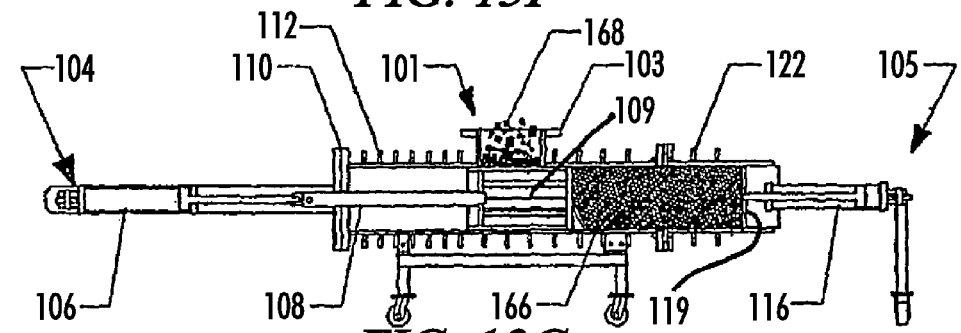
Figure 13H:
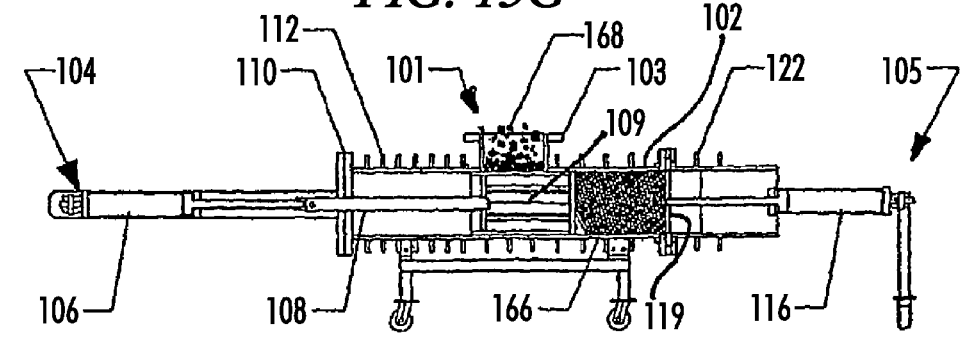
Figure 14A:
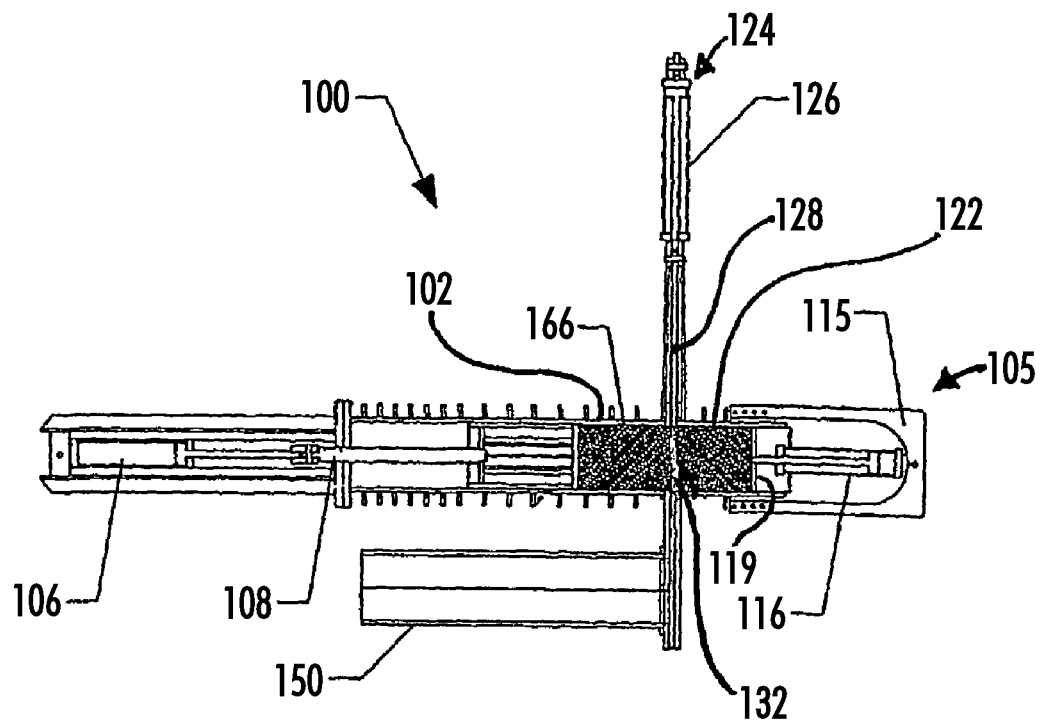
FIGS. 14A, 14C, 14E, and 14F are various operational views of the material handling assembly of FIG. 12, as seen from longitudinal cross-section line E-E.
Figure 14B:
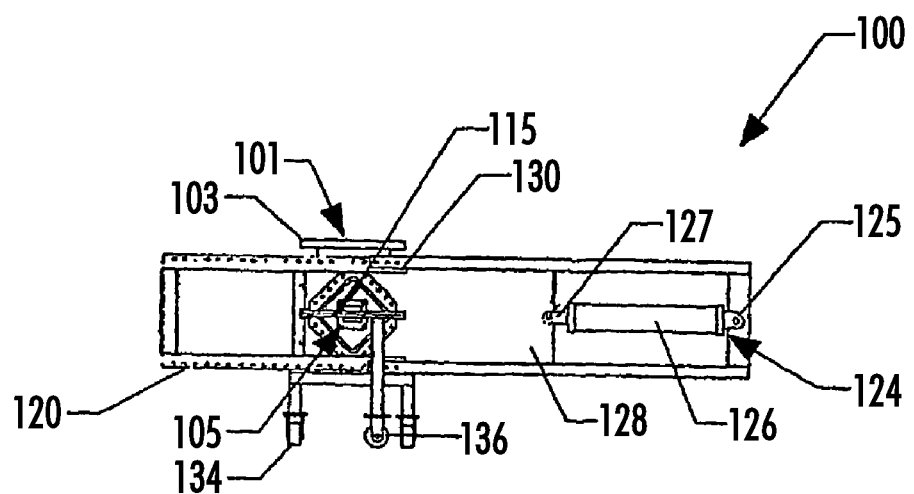
FIGS. 14B and 14D are end views of the material handling apparatus of FIG. 11.
Figure 14C:
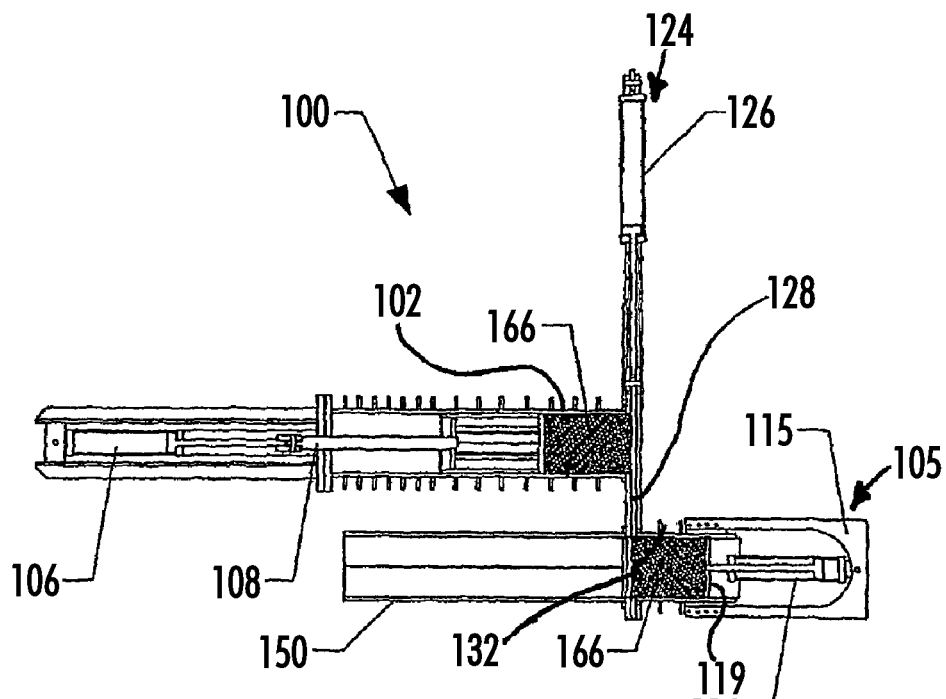
Figure 14D:
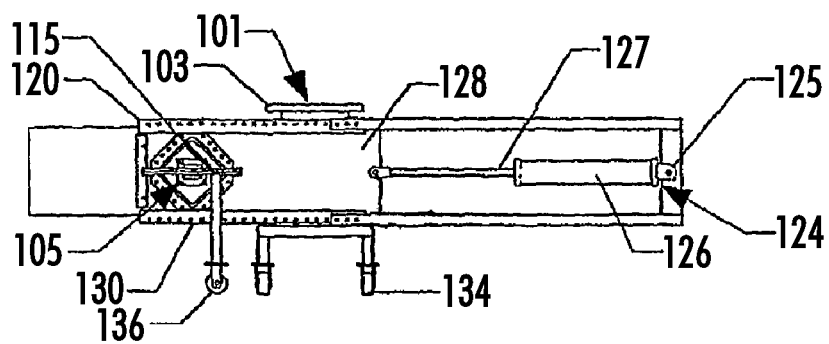

The ram 109 is again withdrawn, as shown in FIG. 13F, allowing still more Fluff 168 to be introduced into the compaction chamber 102. The ram 109 is again extended, as shown in FIG. 13G, forcing the newly added Fluff 168 against the block 166. The operation of introducing Fluff 168 into the compaction chamber 102 and forcing the newly added Fluff 168 against the compacted block of Fluff 166 to form a more lengthy block of Fluff 166 continues until the capacity of the block forming section 122 is met, that is, the stop plate 119 has fully retreated into the block forming section 122 and the cylinder 116 has been completed overridden, as shown in FIGS. 13G and 14A.

The block cutting assembly 124 is used to cut a portion of the block 166 held within the block forming section 122, leaving a portion of the block 166 within the chamber 102. In this regard, with reference to FIGS. 14A through 14D, the cylinder 126 of the block cutting assembly 124 operates to extend the knife 128 and cut the block 166. As the knife 128 extends to cut the block 166, the block cutting assembly 124 moves on the wheeled carriage assembly 136 from a position where the aperture 132 is aligned with the chamber 102, shown in FIGS. 14A and 14B, to a position where the aperture 132 is not aligned with the chamber 102, shown in FIGS. 14C and 14D.

Figure 14E:
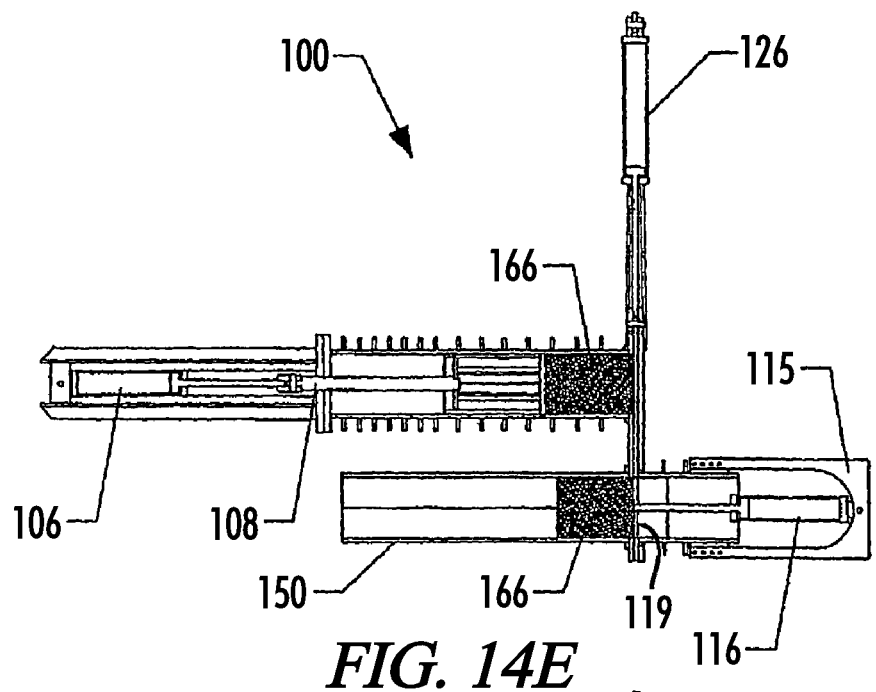
Figure 14F:
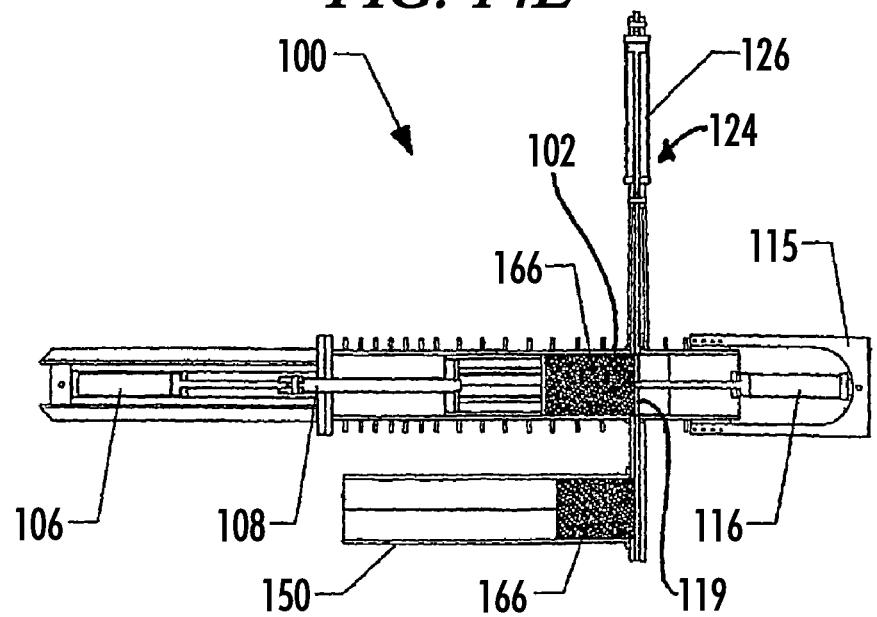

The material handling apparatus 100 may comprise an expansion chamber 150, to which the aperture 132 becomes aligned. With reference to FIG. 14E, the cylinder 116 may operate to extend the stop plate 119, forcing the freshly cut block 166 from the block forming section 122, into the expansion chamber 150. The expansion chamber 150 may not be required if the block 166 is of low temperature and pressure; the freshly cut block 166 could simply be expelled from material handling apparatus. In either event, with reference to FIGS. 13H and 14F, the block cutting assembly 124 is shown realigned with the chamber 102 ready to cooperatively execute the above-described operation.

Figure 15:
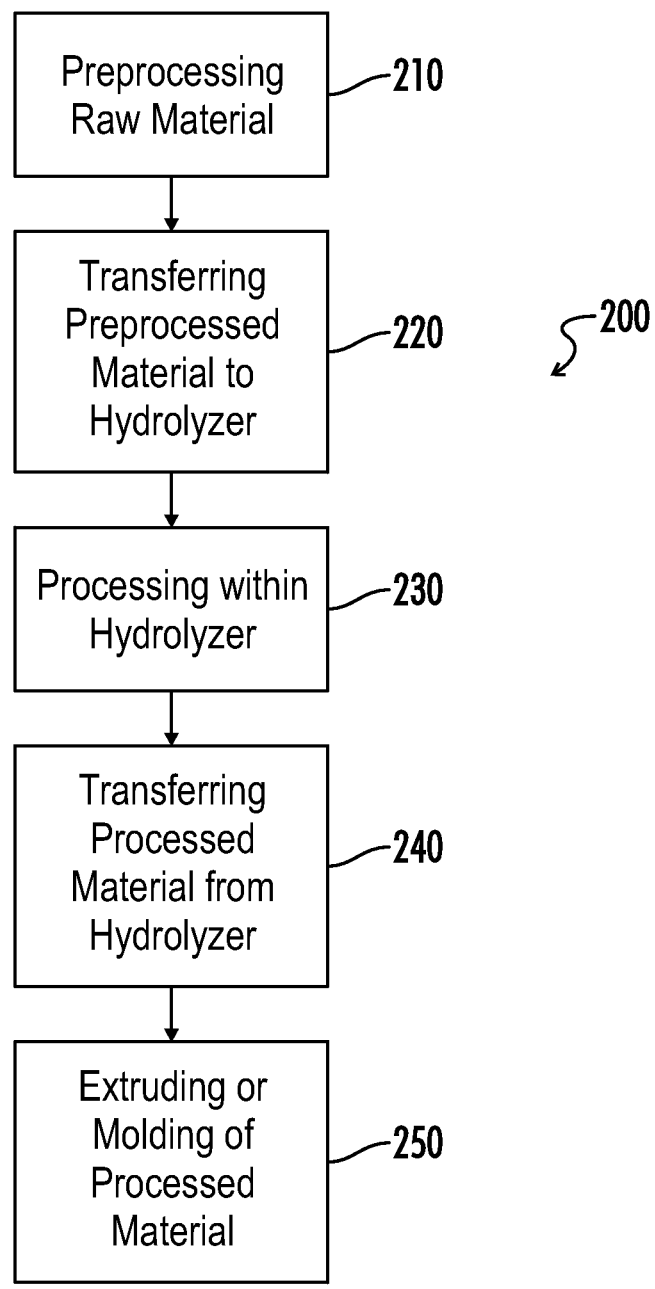
FIG. 15 is a flow chart illustrating an embodiment of a method of the present invention.

In addition to apparatuses and systems described above used in solid waste disposal, the present invention relates to methods for transforming solid waste into useful products, including a reusable, treatable, or readily degradable material, which methods will now be discussed with reference to the embodiment 200 illustrated in FIG. 15.

The illustrated method 200 of the present invention includes the following steps, which are not limited to the order or sequence presented: preprocessing of raw material; transferring preprocessed material to a hydrolyzer; processing the material within the hydrolyzer; transferring processed material, or Fluff, from the hydrolyzer; and extruding or molding the processed material.

As shown in block 210, the exemplary method includes a preprocessing step in which the solid waste is shredded, ground, and, if desired, dewatered prior to insertion into a hydrolyzer or a bioreactor for processing therein. It is contemplated that preprocessing step 210 includes one or more steps resulting in a substantial portion of inorganic material being removed from the waste. The method may also include one or more metal removing steps and one or more size reduction steps. For example, metals may be removed using magnetic means including an eddy current prior to or after the size reduction steps. The size reduction steps may include the use of a grinder, a shredder or other material reduction apparatus used to reduce the incoming particle size of the waste.

The preprocessing 210 may additionally include a step whereby liquid is extracted from wet portions of the solid waste and redistributed to the dry portions of the solid waste to create a substantially uniform hydration level throughout the volume of preprocessed solid waste. In that regard, the shredded and ground raw material may be transferred, either automatically or manually, to a dewatering press in order to uniformly hydrate the material prior to its introduction into the hydrolyzer, for metamorphic processing of the volume reduced waste.

To summarize, the preprocessing step 210 may comprise transforming a solid waste having the first volume and liquid content into a second volume of solid waste wherein the second volume is smaller than the first volume.

As indicated by step 220, the preprocessed material is transferred to a hydrolyzer whose interior vessel is heated in order to heat the material therein. It is contemplated that one embodiment of the hydrolyzer includes an outer containment vessel having an exterior jacket and an interior pressure vessel, an airspace exists between the interior vessel and the jacket, and a heated steam inlet and exit are attached to the jacket and communicate with the air space.

The step 220 may further include continuously feeding the preprocessed material into the hydrolyzer in predetermined volumes. The continuous operation of feeding the material into the hydrolyzer may include the automatic operation of this task by machine.

Referring now to step 230, the preprocessed material is processed within the interior of the hydrolyzer for a given length of time depending upon the user selected temperature and pressure within the steam jacket and hydrolyzer interior. An exemplary temperature of the steam in the outer jacket is about 350 degrees. An exemplary pressure is about 120 psi. Of course, the process of the present invention could be carried out at other temperatures and pressures, and the exemplary temperature or pressure are not a limitation. As will be understood by those skilled in the art, generally speaking, the greater the temperature and pressure in the hydrolyzer the faster the chemical reactions will occur.

The selected pressure and temperature, in conjunction with the preprocessed composition of the material, acts as a catalyst to speed the chemical reaction of decomposition of the material within the vessel. The raised temperature and pressure environment causes the material to rapidly decompose into its basic constituent elements, and allows them to recombine or remain in their organic cellulose form, and it kills bacteria once living within the material. Additional catalysts, such as chemicals or additives, may enhance or accelerate the decomposing phase.

With reference to step 240, after the allotted time within the hydrolyzer has elapsed, the material exits the hydrolyzer. When the processing is complete, the material is transformed into a sterile aggregate cellulose composite material, sometimes referred to herein as "Fluff". The Fluff is a mixture of cellulose fibers and other elements present in the material prior to processing, including chemicals or additives added to the material, if any.

The step 240 of removing the Fluff from the hydrolyzer may further include continuously removing the Fluff from the hydrolyzer in predetermined volumes. The continuous operations of removing the solid waste from the hydrolyzer may include the automatic operation of this task by machine.

Referring now to step 250, the Fluff may be dried and distributed for use or remanufactured into articles, such as compressed bales of material or other molded or extruded articles. Chemical or natural additives may be added to enhance the characteristics of the Fluff or the remanufactured articles. By way of example and not limitation, Fluff may be used to manufacture useful articles including plasticene cross ties, building materials including bricks, boards, and blocks of all sizes, and insulation, or applied to useful applications such as compost and land reclamation fill.

It is contemplated that the exemplary method 200 of the present invention comprises additional steps. For example, a drying step, a purification step wherein inorganic materials are substantially removed from the waste, and a step wherein the Fluff is mixed with plastics, chemicals, or other performance enhancing additives. An exemplary product made by the exemplary method of the present invention may be described as a composite material derived from a process for transforming solid waste, such as a process including the steps described above.

The above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A material intake assembly for reducing the particle size of waste for a waste processing apparatus, the material intake assembly comprising:
 a hopper having an opening, through which waste may enter the hopper, and an inlet, through which material may exit the hopper;
 a housing operatively attached to the hopper and having a particle size reducing apparatus positioned proximate the inlet and opposite the hopper for reducing the particle size of the waste;
 a gate positioned proximate to the inlet and the particle size reducing apparatus, and movable to open and close the inlet between the hopper and the particle size reducing apparatus;
 a gate cylinder operatively attached to the gate, the cylinder positioned to move the gate between an open position allowing passage of the waste into the particle size reducing apparatus and a closed position blocking the passage of the waste into the particle size reducing apparatus; and
 a hinged connection between the hopper and the housing, the hinged connection positioned to allow the hopper to pivot away from the housing.

2. The material intake assembly of claim 1, wherein the gate blocks access to the particle size reducing apparatus when in the closed position and the hopper is pivoted away from the housing.

3. The material intake assembly of claim 1, further comprising a hopper cylinder operatively attached to the hopper, the hopper position to move the hopper between an engaged position wherein the hopper is proximate to the housing and a spaced position wherein the hopper is spaced from the housing.

4. The material intake assembly of claim 1, wherein the particle size reducing apparatus is selected from the group consisting of a hammer mill, a grinder, and a shredder.

5. The material intake assembly of claim 1, the housing further having an open bottom positioned for passage of the waste after processed by the particle size reducing apparatus.

6. The material intake assembly of claim 1, wherein the hinged connection exposes the particle size reducing apparatus when the hopper is pivoted away from the housing.

7. A material intake assembly for reducing the particle size of waste for a waste processing apparatus, the material intake assembly comprising:
 a hopper having an opening, through which waste may enter the hopper, and an inlet, through which material may exit the hopper;
 a housing operatively attached to the hopper and having a particle size reducing apparatus positioned proximate the inlet and opposite the hopper for reducing the particle size of the waste and an open bottom positioned for passage of the waste after reduction by the particle size reducing apparatus;
 a gate positioned proximate to the inlet and the particle size reducing apparatus and movable from an open position to open the inlet to a closed position blocking the inlet between the hopper and the particle size reducing apparatus; and
 a hinged connection between the hopper and the housing, the hinged connection positioned to allow the hopper to pivot away from the housing and expose the particle size reducing apparatus when the hopper is pivoted away from the housing.

8. The material intake assembly of claim 7, further comprising a gate cylinder operatively attached to the gate, the cylinder position to move the gate between the open position allowing passage of the waste into the particle size reducing apparatus and the closed position blocking the passage of the waste into the particle size reducing apparatus.

9. The material intake assembly of claim 8, wherein the gate blocks access to the particle size reducing apparatus when in the closed position and the hopper is pivoted away from the housing.

10. The material intake assembly of claim 7, further comprising a hopper cylinder operatively attached to the hopper, the hopper position to move the hopper between an engaged position wherein the hopper is proximate to the housing and a spaced position wherein the hopper is spaced from the housing.

11. The material intake assembly of claim 7, wherein the particle size reducing apparatus is selected from the group consisting of a hammer mill, a grinder, and a shredder.

12. A material intake assembly for reducing the particle size of waste for a waste processing apparatus, the material intake assembly comprising:
 a hopper having an opening, through which waste may enter the hopper, and an inlet, through which material may exit the hopper;
 a housing operatively attached to the hopper and having a particle size reducing apparatus positioned proximate the inlet and opposite the hopper for reducing the particle size of the waste and an open bottom positioned for passage of the waste after reduction by the particle size reducing apparatus;
 a gate positioned proximate to the inlet and the particle size reducing apparatus and movable from an open position to open the inlet to a closed position blocking the inlet between the hopper and the particle size reducing apparatus;
 a hinged connection between the hopper and the housing, the hinged connection positioned to allow the hopper to pivot away from the housing and expose the particle size reducing apparatus when the hopper is pivoted away from the housing; and
 a gate cylinder operatively attached to the gate, the cylinder positioned to move the gate between the open position allowing passage of the waste into the particle size reducing apparatus and the closed position blocking the passage of the waste into the particle size reducing apparatus.

13. The material intake assembly of claim 12, wherein the gate blocks access to the particle size reducing apparatus when in the closed position and the hopper is pivoted away from the housing.

14. The material intake assembly of claim 12, further comprising a hopper cylinder operatively attached to the hopper, the hopper position to move the hopper between an engaged position wherein the hopper is proximate to the housing and a spaced position wherein the hopper is spaced from the housing.

15. The material intake assembly of claim 12, wherein the particle size reducing apparatus is selected from the group consisting of a hammer mill, a grinder, and a shredder.

16. The material intake assembly of claim 12, wherein the gate blocks access to the particle size reducing apparatus when in the closed position and the hopper is proximate to the housing; and further comprising a hopper cylinder operatively attached to the hopper, the hopper position to move the hopper between an engaged position wherein the hopper is proximate to the housing and a spaced position wherein the hopper is spaced from the housing.

17. The material intake assembly of claim 16, wherein the particle size reducing apparatus is selected from the group consisting of a hammer mill, a grinder, and a shredder.

\* \* \* \* \*